United States Patent [19]

Sasaki et al.

[11] Patent Number: 4,830,943
[45] Date of Patent: May 16, 1989

[54] BISAZO COMPOUNDS AND ELECTROPHOTOGRAPHIC PHOTOCONDUCTORS COMPRISING THE BISAZO COMPOUNDS

[75] Inventors: Masaomi Sasaki, Susono; Tomoyuki Shimada, Numazu, both of Japan

[73] Assignee: Ricoh Company, Ltd., Tokyo, Japan

[21] Appl. No.: 49,298

[22] Filed: May 13, 1987

[30] Foreign Application Priority Data

| May 15, 1986 | [JP] | Japan | 61-111287 |
| May 15, 1986 | [JP] | Japan | 61-111288 |
| May 20, 1986 | [JP] | Japan | 61-115762 |
| May 21, 1986 | [JP] | Japan | 61-118269 |
| May 26, 1986 | [JP] | Japan | 61-119269 |
| May 26, 1986 | [JP] | Japan | 61-119272 |
| May 26, 1986 | [JP] | Japan | 61-119271 |

[51] Int. Cl.$^4$ .............. G03G 5/06; G03G 5/14
[52] U.S. Cl. ........................ 430/58; 430/74; 430/75; 430/78
[58] Field of Search .......... 430/74, 57, 58, 75, 430/78

[56] References Cited

U.S. PATENT DOCUMENTS 4,622,280 11/1986 Makino et al. .............. 430/75 X

Primary Examiner—J. David Welsh
Attorney, Agent, or Firm—Oblon, Fisher, Spivak, McClelland & Maier

[57] ABSTRACT

A bisazo compound of the general formula:

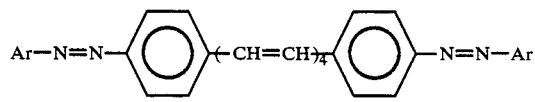

where Ar is selected from the group consisting of substituents (a)~(i), (Abstract continued on next page.)

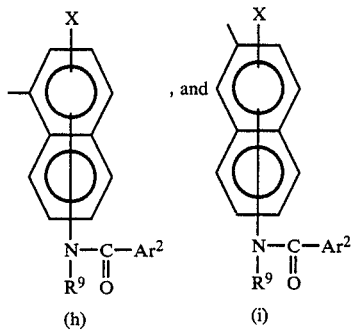

a dinitro compound, a diamino compound, and a tetrazonium salt, which respectively serve as a starting material, a first intermediate and a second intermediate for producing the above bisazo compound are prepared, and an electrophotographic photoconductor comprising an electroconductive support having thereon a photoconductive layer containing any of the above bisazo compounds is disclosed.

8 Claims, 8 Drawing Sheets

BISAZO COMPOUND NO. 1 IN TABLE 1

BISAZO COMPOUND NO. 58 IN TABLE I

BISAZO COMPOUNDS AND ELECTROPHOTOGRAPHIC PHOTOCONDUCTORS COMPRISING THE BISAZO COMPOUNDS

BACKGROUND OF THE INVENTION

The present invention relates to novel bisazo compounds, and an electrophotographic photoconductor comprising an electroconductive support and a photoconductive layer formed thereon containing any of the bisazo compounds as charge generating material.

In an electrophotographic process, a photoconductor is first exposed to corona charges in the dark so as to electrically charge the surface of the photoconductor uniformly. The thus uniformly charged photoconductor is then exposed to original light images and the exposed portions of the photoconductor selectively become electroconductive and electric charges dissipate therefrom, so that latent electrostatic images corresponding to the original light images are formed on the surface of the photoconductor. The latent electrostatic images are then developed by the so-called toner which comprises a colorant, such as a dye or a pigment, and a binder agent made, for instance, of a polymeric material; thus, visible developed images can be obtained on the photoconductor. It is necessary that photoconductors for use in electrophotography have at least the following fundamental properties: (1) chargeability to a predetermined potential in the dark; (2) minimum electric charge dissipation in the dark; and (3) quick dissipation of electric charges upon exposure to light.

Conventionally, a variety of inorganic and organic electrophotographic photoconductors are known. As inorganic photoconductors for use in electrophotography, there are known types, in which, for instance, selenium, cadmium sulfide or zinc oxide is employed as the photoconductive material.

While the above-mentioned inorganic electrophotographic photoconductors have many advantages over other conventional electrophotographic photoconductors, they have several shortcomings as well in view of the practical use thereof.

For instance, a selenium photoconductor, which is widely used at present, meets the above-mentioned three conditions (1) through (3) fairly well, but it has the shortcomings that it is difficult to work it into the form of a belt due to its poor flexibility, accordingly its production cost is high, and it is so vulnerable to mechanical shocks that it must be handled with the utmost care.

Cadmium sulfide photoconductors and zinc oxide photoconductors are prepared by dispersing cadmium sulfide or zinc oxide in a binder resin. They can be produced at lower cost as compared with selenium photoconductors and are also used widely in practice. However, the cadmium sulfide and zinc oxide photoconductors are poor in surface smoothness, hardness, tensile strength and wear resistance. Therefore, they are not suitable as photoconductors for use in plain paper copiers in which the photoconductors are used many times in quick repetition.

Recently, organic electrophotographic photoconductors, which are said not to have such shortcomings as in the inorganic electrophotographic photoconductors, have been proposed, and some of them are in fact used in practice. A representative example of such organic electrophotographic photoconductor is an electrophotographic photoconductor comprising a charge transporting complex consisting essentially of poly-N-vinylcarbazole and 2, 4, 7-trinitro-fluorene-9-one.

Although the above-mentioned organic electrophotographic photoconductor has many advantages over other conventional electrophotographic photoconductors, it is not suitable for use in high speed copying machines, particularly because of its insufficient electrophotographic photosensitivity.

Recently there have been performed extensive studies directed to the elimination of the above-mentioned shortcomings of the conventional electrophotographic photoconductors. In the course of these studies, double-layered organic electrophotographic photoconductors are proposed as having higher electrophotographic sensitivity and more stable chargeability than other conventional organic electrophotographic photoconductors. Some of them are used in practice in plain paper copiers. Such double-layered photoconductors comprise an electroconductive support, a charge generating layer, which is a thin layer of an organic pigment formed on the electroconductive support, and a charge transporting layer consisting essentially of a charge transporting material, formed on the charge generating layer.

Specific examples of such conventional double-layered organic photoconductor are as follows:

(1) A double-layered organic photoconductor comprising a charge generating layer which is a vacuum-evaporated perylene derivative on an electroconductive support, and a charge transporting layer comprising an oxadiazole derivative as proposed in U.S. Pat. No. 3,871,882.

(2) A double-layered organic photoconductor comprising a charge generating layer which is formed by coating an organic amine solution of Chloro Diane Blue on an electroconductive support and drying the coated solution, and a charge transporting layer consisting essentially of a hydrazone compound as proposed in Japanese Patent Publication No. 55-42380.

(3) A double-layered organic photoconductor comprising a charge generating layer which is formed by coating an organic dispersion of a distyryl benzene type bisazo compound on an electroconductive support and drying the coated dispersion, and a charge transporting layer consisting essentially of a hydrazone compound as proposed in Japanese Laid-Open Patent Application No. 55-84943.

The above double-layered electrophotographic organic photoconductors of course have many advantages over other organic photoconductors, but they still have the following shortcomings as well.

The above-mentioned double-layered organic photoconductor (1) comprising a charge generating layer of a perylene derivative and a charge transporting layer of an oxadiazole derivative can be satisfactorily used in a conventional copying machine. However, its electrophotographic sensitivity is still insufficient for use in high speed copying machine. Furthermore, the perylene derivative used as the charge generating material, upon which the spectral sensitivity of the photoconductor entirely depends, does not exhibit any spectral sensitivity in the entirely depends, does not exhibit any spectral sensitivity in the entire visible light region. Therefore, it is unsuitable for use in color copier.

The double-layered organic photoconductor (2) comprising a charge generating layer of Chloro Diane Blue and a charge transporting layer of a hydrazone compound has a relatively high electrophotographic photosensitivity. However, when forming the charge transporting layer, an organic amine, such as ethylenediamine, has to be employed, which must be handled with the utmost care because of its caustic nature and the irritating properties of its vapor.

The double-layered organic photoconductor (3) comprising a charge generating layer of a distyryl benzene type bisazo compound and a charge transporting layer consisting essentially of a hydrazone compound has the advantage that its production is easy since the charge generating layer can be formed by merely coating a dispersion of a bisazo compound on the support. However, its electrophotographic photosensitivity is also insufficient for use in high speed copier. Another shortcoming of the photoconductor is that it cannot be used in a laser printer using semi-conductor laser due to its extremely low photosensitivity to semi-conductor laser, in spite of a recent demand for a photoconductor having high photosensitivity in the wavelength region of semi-conductor laser.

Furthermore, it is known that the following bisazo compounds are useful as charge generating pigments for a double-layered organic photoconductor.

Benzidine-type bisazo compounds as described, for instance, in Japanese Laid-Open Patent Application Nos. 47-37543 and No. 52-55643; stilene-type bisazo compounds as described, for instance, in Japanese Laid-Open Patent Application No. 52-8832; diphenylhexatriene-type bisazo compounds as described, for instance, in Japanese Laid-Open Patent Application No. 58-222152; and diphenylbutadiene-type bisazo compounds as described, for instance, in Japanese Laid-Open Patent Application No. 58-222153.

The double-layered organic photoconductors using the above conventional bisazo compounds are unsuitable for use in high speed copying machines and laser printers due to their insufficient electrophotographic photosensitivities.

SUMMARY OF THE INVENTION

It is therefore an object of the present invention to provide novel bisazo compounds which can be employed as a charge generating material for use in a double-layered electrophotographic organic photoconductor.

Another object of the present invention is to provide an electrophotographic photoconductor comprising an electroconductive support and a photoconductive layer formed thereon comprising any of the novel bisazo compounds, which photoconductor has uniform photosensitivities throughout a visible light region and the entire wavelength region of semi-conductor laser.

A further object of the present invention is to provide an electrophotographic photoconductor suitable not only for use in a laser printer, but also for use in high speed electrophotographic copying apparatus, with the conventional shortcomings eliminated therefrom.

Still another object of the present invention is to provide a tetrazonium salt serving as an intermediate for producing the above-mentioned novel bisazo compounds.

A still further object of the present invention is to provide 1,8-bis(4-nitrophenyl)-1,3,5,7-octatetraene which serves as a starting material for preparing the above-mentioned tetrazonium salt.

A further object of the present invention is to provide 1,8-bis(4-aminophenyl)-1,3,5,7-octatetraene which serves as an intermediate for preparing the above tetrazonium salt.

The bisazo compounds according to the present invention are represented by the following general formula (I):

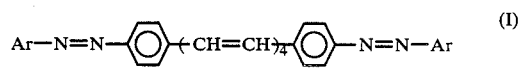

The above bisazo compounds can be prepared by reacting a tetrazonium salt having the following general formula (II) with a coupler having a general formula (III):

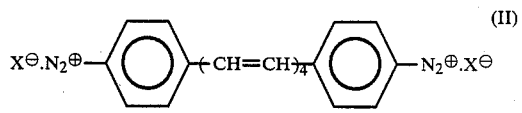

wherein X represents an anionic functional group, and

DETAILED DESCRIPTION OF THE PREFERRED EMBODIMENTS

Figure 1:
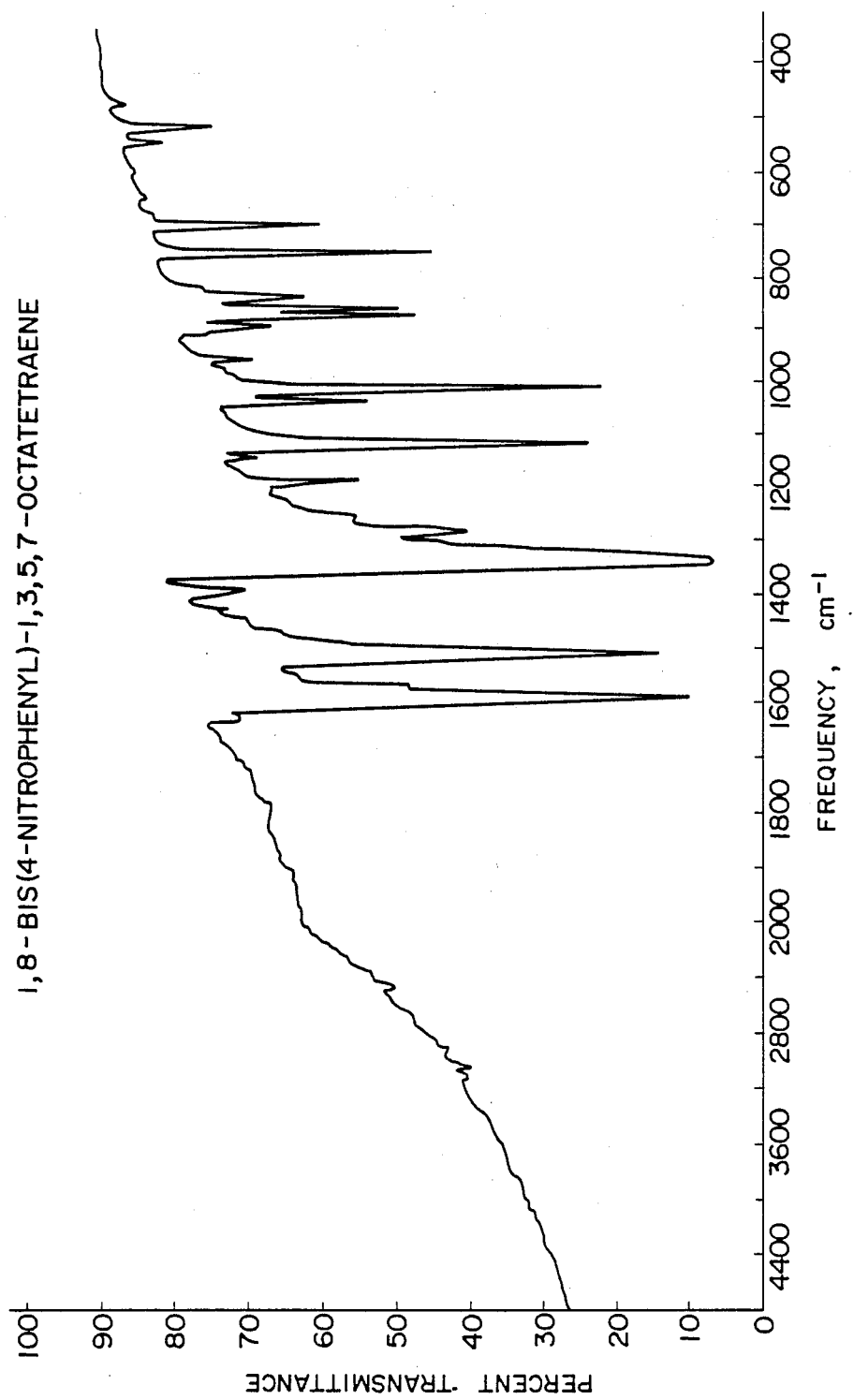
FIG. 1 is an infrared spectrum of a dinitro compound which is a starting material for producing a bisazo compound according to the present invention.

As mentioned previously, the bisazo compounds according to the present invention are represented by the following general formula (I):

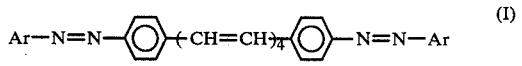

As the coupler employed in producing the above bisazo compounds, the following compounds having general formula (III) can be employed:

Examples of such coupler for use in the present invention are aromatic hydrocarbon compounds having hydroxyl group, such as phenol, naphthol and derivatives thereof; heterocyclic compounds having hydroxyl group; aromatic hydrocarbon compounds having amino group; heterocyclic compounds having amino group;

aromatic hydrocarbon compounds and heterocyclic compounds having both hydroxyl group and amino group, such as aminonaphthol and derivatives thereof; aliphatic compounds having keto-enol group (active methylene group); and aromatic compounds having keto-enol group (active methylene group).

Of the above couplers, those having the following moieties as Ar are preferable for use in the present invention:

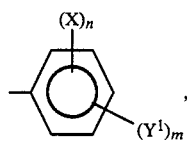  (III-1)

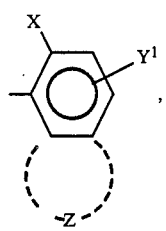  (III-2)

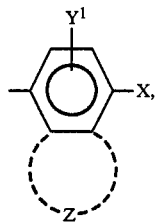  (III-3)

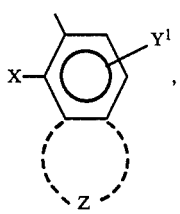  (III-4)

wherein X, Y$^1$, Z, m and n respectively represent the following:

X: —OH,

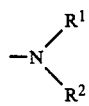

or —NHSO$_2$—R$^3$ wherein R$^1$ and R$^2$ each represent hydrogen, an alkyl group which may have a substituent, and R$^3$ represents an alkyl group which may have a substituent or an aryl group which may have a substituent.

Y$^1$: hydrogen, halogen, an alkyl group which may have a substituent, an alkoxyl group which may have a substituent, a carboxyl group, a sulfo group, a sulfamoyl group which may have a substituent, or

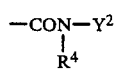

(wherein R$^4$ represents hydrogen, an alkyl group which may have a substituent, a phenyl group which may have a substituent; and Y$^2$ represents a cyclic hydrocarbon group or a heterocyclic group, each of which may have a substituent, or

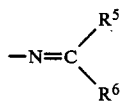

(wherein R$^5$ represents a cyclic hydrocarbon group which may have a substituent, a heterocyclic group which may have a substituent, or a styryl group which may have a substituent, R$^6$ represents hydrogen, an alkyl group which may have a substituent, or a phenyl group which may have a substituent, or R$^5$ and R$^6$ may form a ring through carbon atoms bonded thereto)).

Z: a cyclic hydrocarbon group which may have a substituent, or a heterocyclic group which may have a substituent.

n: an integer of 1 or 2.
m: an integer of 1 or 2.

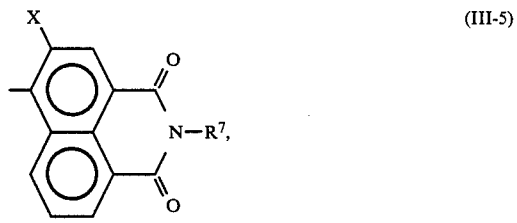  (III-5)

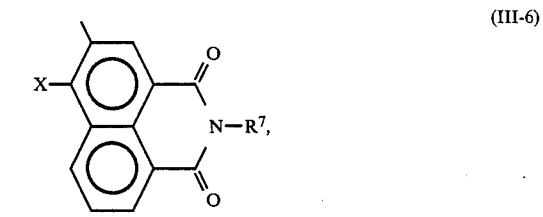  (III-6)

wherein R$^7$ represents a hydrocarbon group which may have a substituent, and X is the same as defined previously.

  (III-7)

wherein R$^8$ represents an alkyl group, a carbamoyl group, a carboxyl group or an ester group thereof, Ar$^1$ represents a cyclic hydrocarbon group which may have a substituent, and X is the same as defined previously.

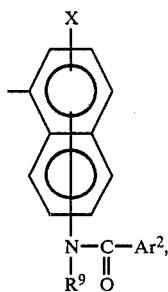

(III-8)

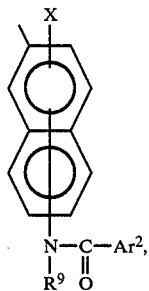

(III-9)

wherein $R^9$ represents hydrogen or a hydrocarbon group which may have a substituent, $Ar^2$ represents a cyclic hydrocarbon group which may have a substituent, and X is the same as defined previously.

In the above general formulas (III-1), (III-2), (III-3) and (III-4), examples of a cyclic hydrocarbon group represented by Z are benzene ring and naphthalene ring, and examples of a heterocyclic group represented by Z are indole ring, carbazole ring, and benzofuran ring. Examples of a substituent of the cyclic hydrocarbon group or heterocyclic group represented by Z are halogen such as chlorine and bromine, and an alkoxyl group.

Examples of a cyclic hydrocarbon group represented by $Y^2$ or $R^5$ are phenyl group, naphthyl group, anthryl group, and pyrenyl group. Examples of a heterocyclic group represented by $Y^2$ or $R^5$ are pyridyl group, thienyl group, furyl group, indolyl group, benzofuranyl group, carbazolyl group and dibenzofuranyl group. An example of a ring formed by combination of $R^5$ and $R^6$ is fluorene ring.

Examples of a substituent of the cyclic hydrocarbon group or heterocyclic group represented by $Y^2$ or $R^5$, and examples of a substituent of the ring formed by $R^5$ and $R^6$, are an alkyl group such as methyl group, ethyl group, propyl group and butyl group; an alkoxyl group such as methoxy group, ethoxy group, propoxy group and butoxy group; a halogen such as chlorine and bromine; a dialkyl amino group such as dimethylamino group and diethylamino group; a diaralkylamino group such as dibenzylamino group; a halomethyl group such as trifluoromethyl group; a nitro group; a cyano group; a carboxyl group or an ester group thereof; a hydroxyl group; and a sulfonate group such as —$SO_3Na$.

An example of a substituent of the phenyl group represented by $R^4$ is a halogen such as chlorine and bromine.

Examples of the hydrocarbon group represented by $R^7$ or $R^9$ are an alkyl group such as methyl group, ethyl group, propyl group and butyl group, an aralkyl group such as benzyl group, and an aryl group such as phenyl group, which groups may have a substituent.

In the general formulas (III-5), (III-6), (III-7) and (III-8), examples of a substituent of the hydrocarbon group represented by $R^7$ or $R^9$ are an alkyl group such as methyl group, ethyl group, propyl group and butyl group, an alkoxyl group such as methoxy group, ethoxy group, propoxy group and butoxy group, a halogen such as chlorine and bromine, a hydroxyl group, and a nitro group.

Represented examples of the cyclic hydrocarbon group represented by $Ar^1$ or $Ar^2$ are phenyl group and naphthyl group. Examples of a substituent of these cyclic hydrocarbon groups are an alkyl group such as methyl group, ethyl group, propyl group and butyl group, and an alkoxyl group such as methoxy group, ethoxy group, propoxy group and butoxy group, a nitro group, a halogen such as chlorine and bromine, a cyano group, and a dialkylamino group such as dimethylamino group and diethylamino group.

Of the couplers having the coupler moieties represented by general formulas (III-1) through (III-9), those in which X is hydroxyl group are preferable for use in the present invention.

Of the couplers having the above mentioned coupler moieties of (III-1) through (III-9), those having the coupler moieties (III-2), (III-5), (III-6), (III-7), (III-8) and (III-9) are preferable for use in the present invention. Further, of the group of these couplers, those in which X is hydroxyl group are preferable. Of the group of the couplers having the gerneral formula (III-2), the couplers having the moiety represented by the following general formula (III-2A) are preferable for use in the present invention:

(III-2A)

wherein $Y^1$ and Z are respectively the same as those defined previously.

Of the group of the couplers having the moiety represented by the general formula (III-2A), the couplers having the moiety represented by the following general formula (III-2AA) are preferable for use in the present invention:

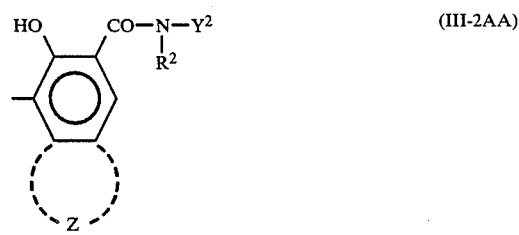

(III-2AA)

wherein Z, $Y^2$ and $R^2$ are respectively the same as those defined previously.

Of the group of the couplers having the moiety represented by the general formula (III-2AA), the couplers having the moiety represented by the following general formula (III-2AA-1) or (III-2AA-2) are preferable for use in the present invention:

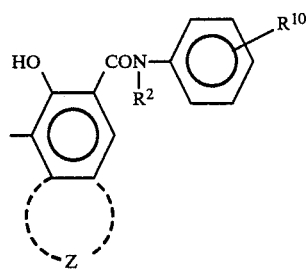

(III-2AA-1)

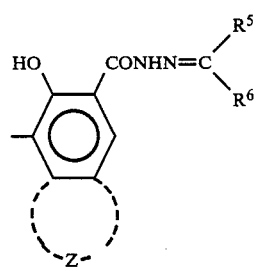

(III-2AA-2)

wherein Z, $R^2$, $R^5$ and $R^6$ are respectively the same as those defined previously, and $R^{10}$ represents an alkyl group such as methyl group, ethyl group, propyl group and butyl group; an alkoxyl group such as methoxy group, ethoxy group, propoxy group and butoxy group; a halogen such as chlorine and bromine; a dialkyl amino group such as dimethylamino group and diethylamino group; a diaralkylamino group such as dibenzylamino group; a halomethyl group such as trifluoromethyl group; a nitro group; a cyano group; a carboxyl group or an ester group thereof; a hydroxyl group; and a sulfonate group such as —$SO_3Na$.

Specific examples of a bisazo compound according to the present invention are shown below only by showing the structure of the moiety Ar in the following general formula of the bisazo compound.

TABLE 1

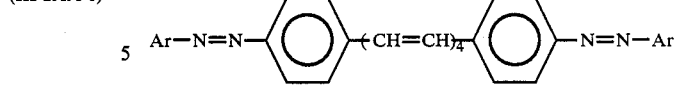

(I)

| Bisazo Compound No. | Ar |
|---|---|
| 1 | HO—[naphthalene]—CONH—[phenyl] |
| 2 | HO—[naphthalene]—CONH—[phenyl-2-CH₃] |
| 3 | HO—[naphthalene]—CONH—[phenyl-3-CH₃] |
| 4 | HO—[naphthalene]—CONH—[phenyl-4-CH₃] |
| 5 | HO—[naphthalene]—CONH—[phenyl-2-C₂H₅] |
| 6 | HO—[naphthalene]—CONH—[phenyl-3-C₂H₅] |

TABLE 1-continued
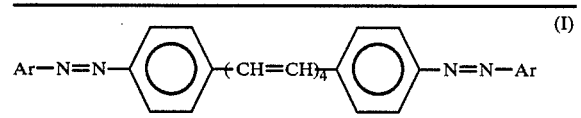
Bisazo Compound No. | Ar
7 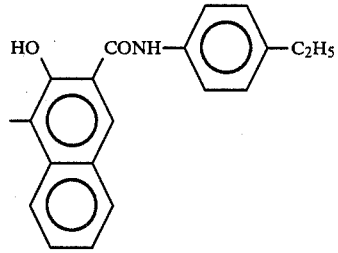
8 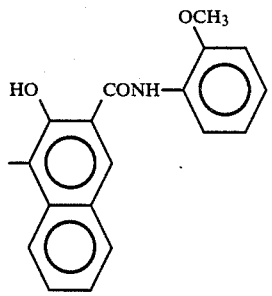
9 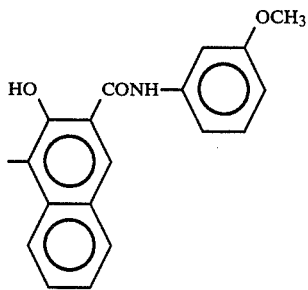
10 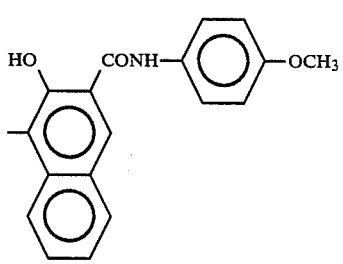
11 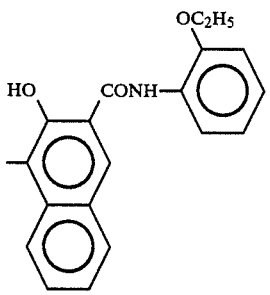
TABLE 1-continued
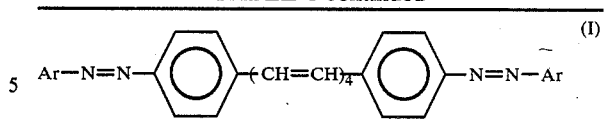
Bisazo Compound No. | Ar
12 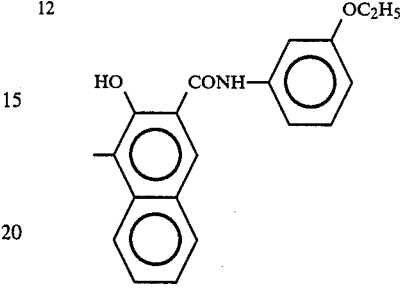
13 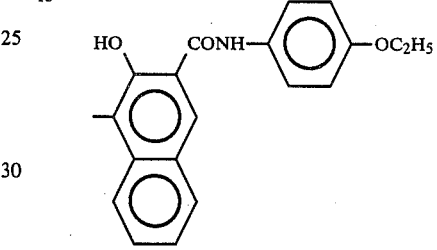
14 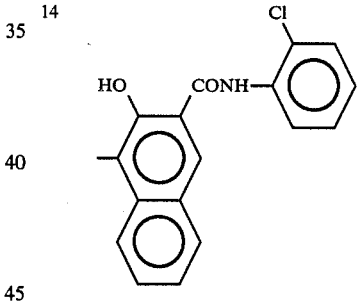
15 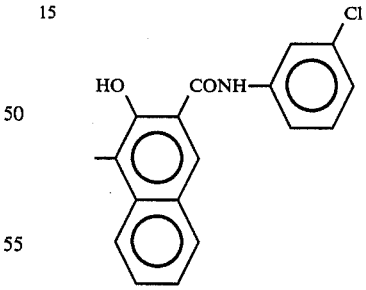
16 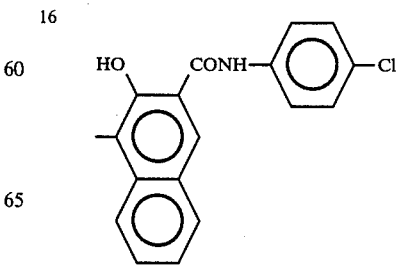

TABLE 1-continued
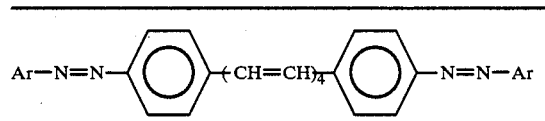
Bisazo Compound No.    Ar
17
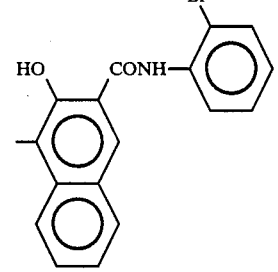
18
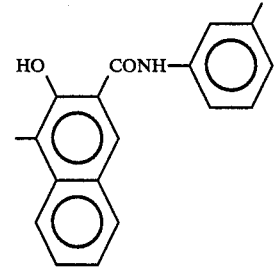
19
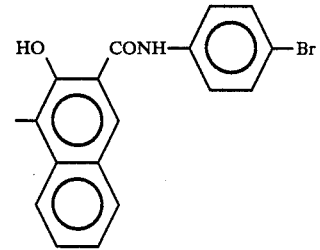
20
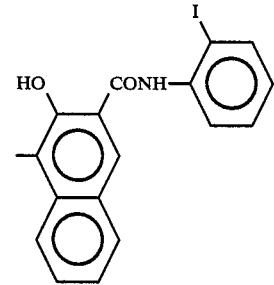
21
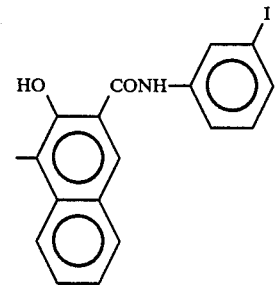
TABLE 1-continued
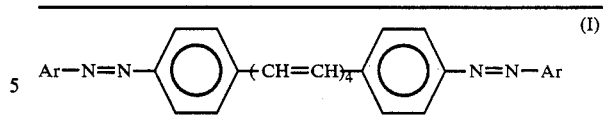
Bisazo Compound No.    Ar
22
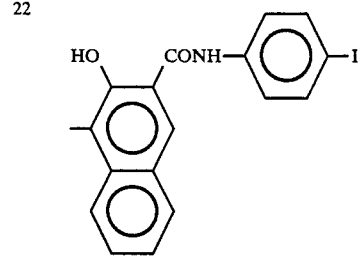
23
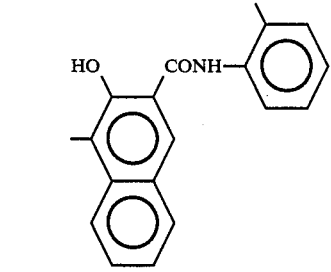
24
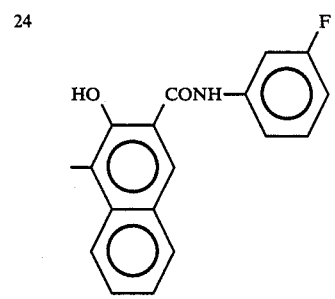
25
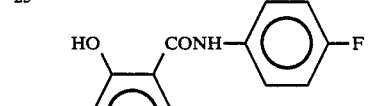
26
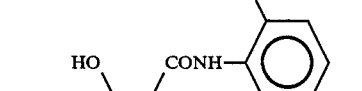

TABLE 1-continued $$Ar-N=N-\underset{}{\bigcirc}\!\!-(CH=CH)_4-\underset{}{\bigcirc}\!\!-N=N-Ar \qquad (I)$$

| Bisazo Compound No. | Ar |
|---|---|
| 27 | 3-hydroxy-naphthalene-2-carboxylic acid (3-trifluoromethyl)anilide |
| 28 | 3-hydroxy-naphthalene-2-carboxylic acid (4-trifluoromethyl)anilide |
| 29 | 3-hydroxy-naphthalene-2-carboxylic acid (2-cyano)anilide |
| 30 | 3-hydroxy-naphthalene-2-carboxylic acid (3-cyano)anilide |
| 31 | 3-hydroxy-naphthalene-2-carboxylic acid (4-cyano)anilide |
| 32 | 3-hydroxy-naphthalene-2-carboxylic acid (2-nitro)anilide |
| 33 | 3-hydroxy-naphthalene-2-carboxylic acid (3-nitro)anilide |
| 34 | 3-hydroxy-naphthalene-2-carboxylic acid (4-nitro)anilide |
| 35 | 3-hydroxy-naphthalene-2-carboxylic acid (4-carboxy)anilide |
| 36 | 3-hydroxy-naphthalene-2-carboxylic acid (4-ethoxycarbonyl)anilide |

TABLE 1-continued
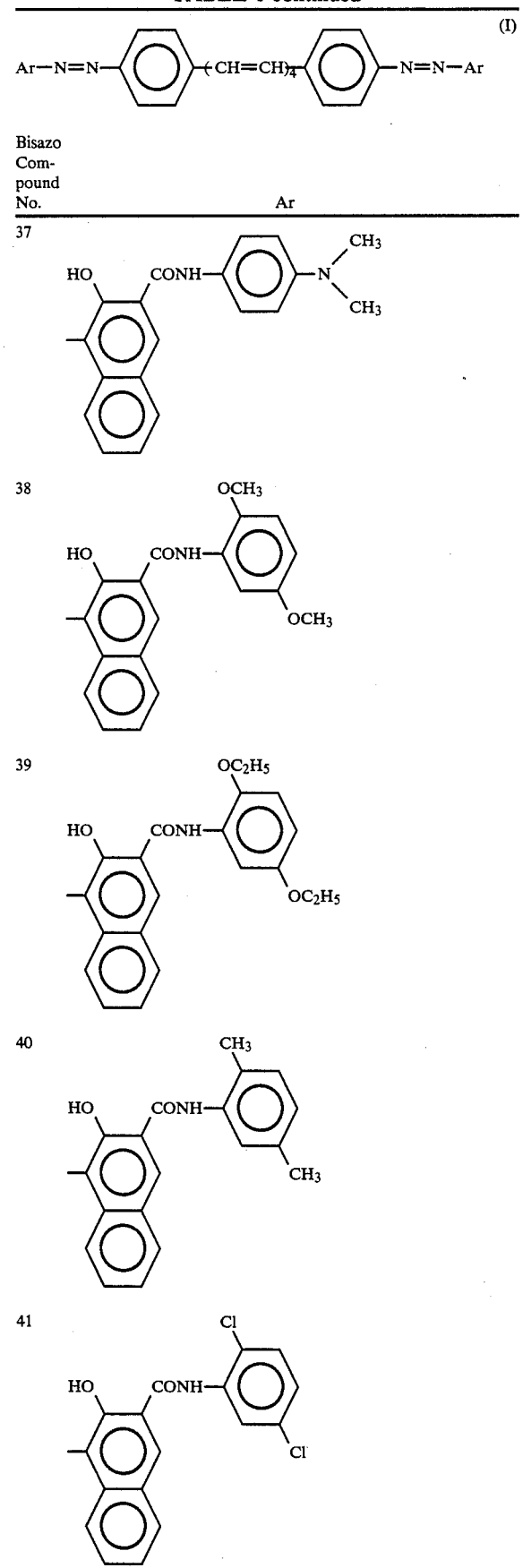
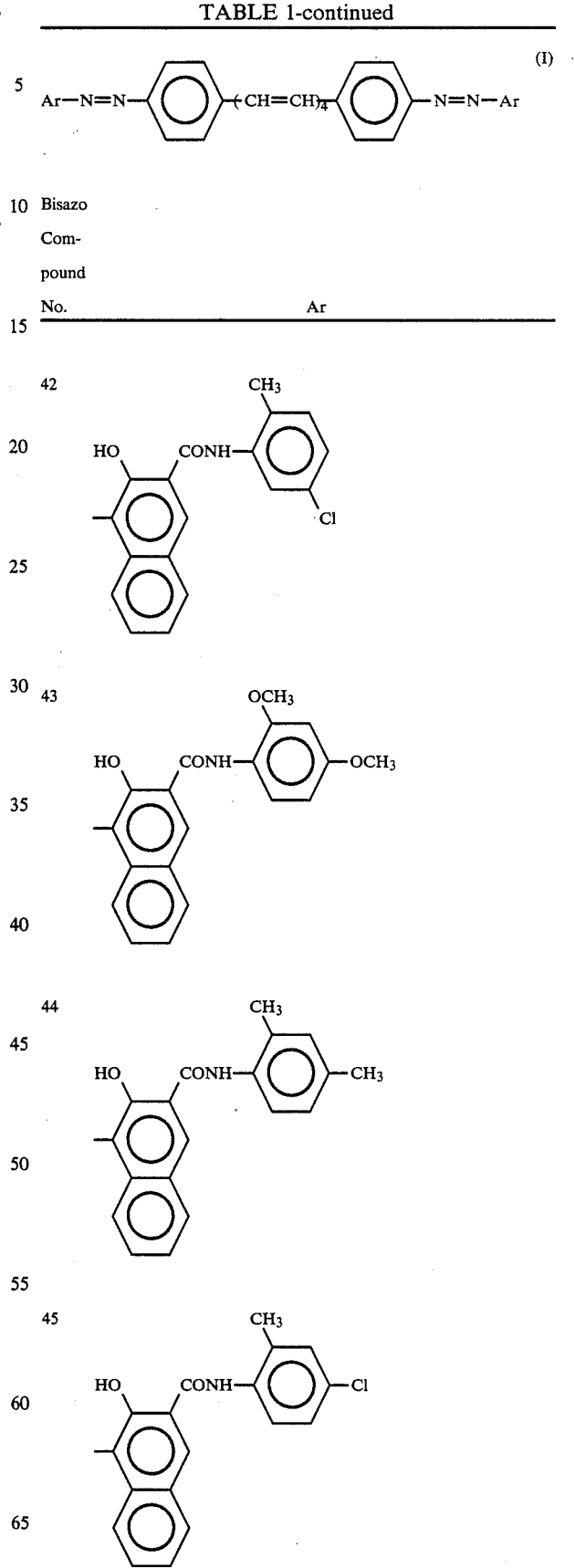

TABLE 1-continued $$Ar-N=N-\underset{}{\underset{}{\bigcirc}}(CH=CH)_4-\underset{}{\underset{}{\bigcirc}}-N=N-Ar \quad (I)$$

| Bisazo Compound No. | Ar |
|---|---|
| 46 | 3-hydroxy-2-naphthamide of 2-nitro-4-methoxyaniline (HO, CONH, NO₂, OCH₃) |
| 47 | 3-hydroxy-2-naphthamide of 3,5-dimethoxyaniline (HO, CONH, OCH₃, OCH₃) |
| 48 | 3-hydroxy-2-naphthamide of 2-methoxy-5-bromoaniline (HO, CONH, OCH₃, Br) |
| 49 | 3-hydroxy-2-naphthamide of 2-methyl-4-methoxyaniline (HO, CONH, CH₃, OCH₃) |
| 50 | 3-hydroxy-2-naphthamide of 2,5-dimethoxy-4-chloroaniline (HO, CONH, OCH₃, Cl, OCH₃) |
| 51 | 3-hydroxy-2-naphthamide of 4-sulfoaniline sodium salt (HO, CONH, SO₃Na) |
| 52 | 3-hydroxy-2-naphthamide of 4-tert-butoxyaniline (HO, CONH, OC₄H₉(tert)) |
| 53 | 3-hydroxy-2-naphthamide of 1-naphthylamine (HO, CONH, naphthyl) |
| 54 | 3-hydroxy-2-naphthamide of 2-naphthylamine (HO, CONH, naphthyl) |

TABLE 1-continued
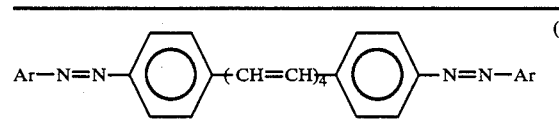
Bisazo Compound No. | Ar
---|---
55 | 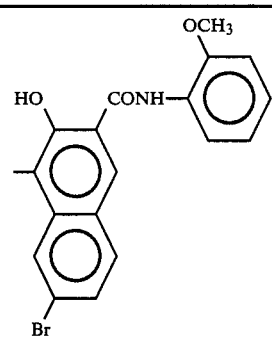
56 | 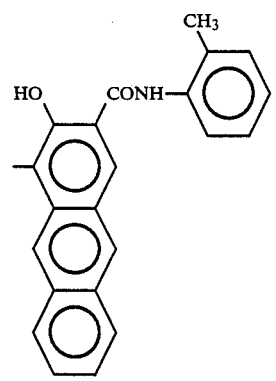
57 | 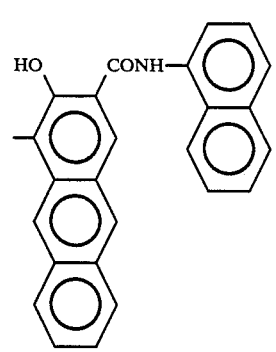
58 | 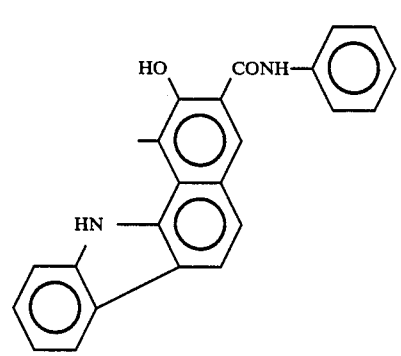
TABLE 1-continued
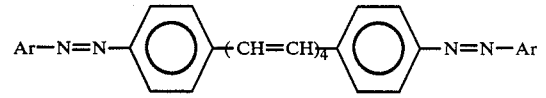
Bisazo Compound No. | Ar
---|---
59 | 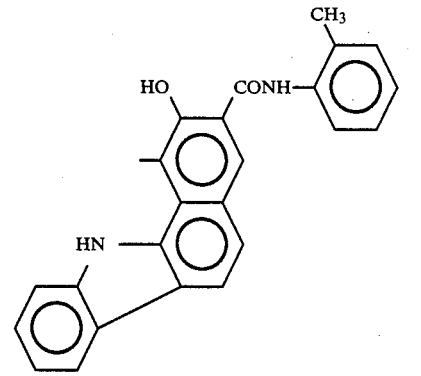
60 | 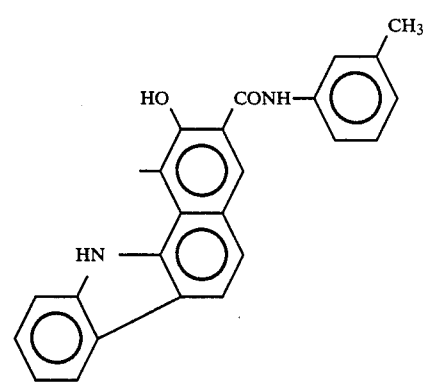
61 | 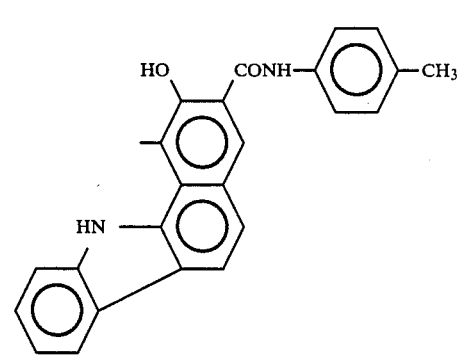

TABLE 1-continued
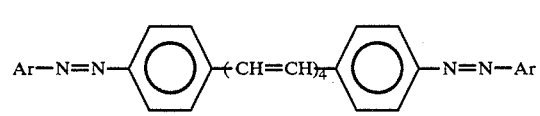 (I)
Bisazo Compound No. | Ar
62 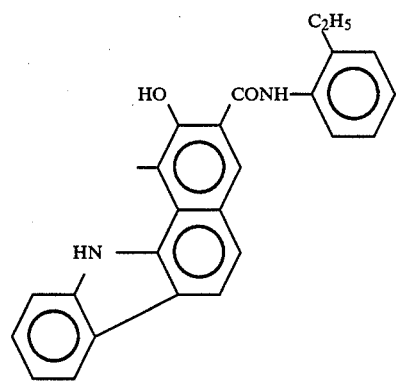
63 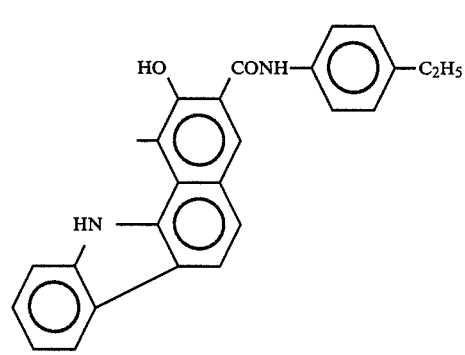
64 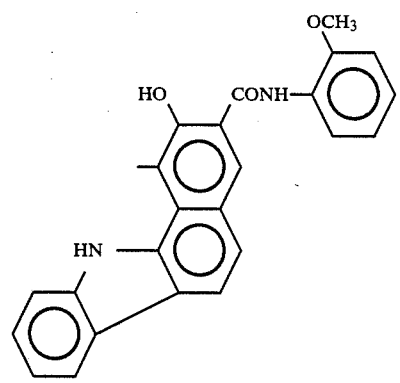
TABLE 1-continued
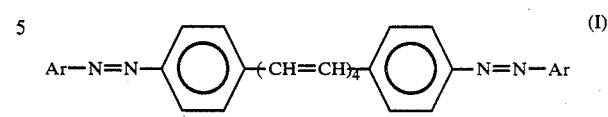 (I)
Bisazo Compound No. | Ar
65 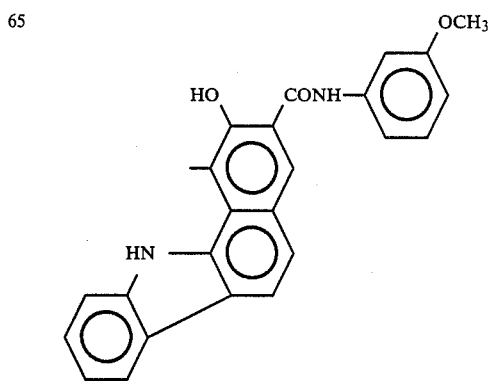
66 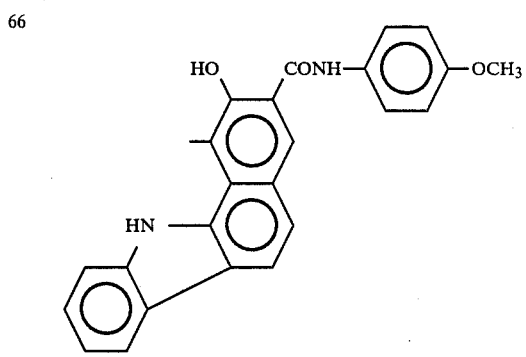
67 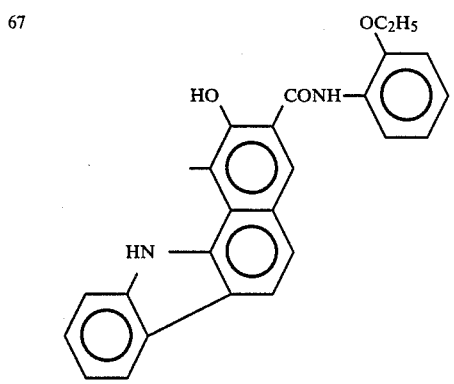

TABLE 1-continued
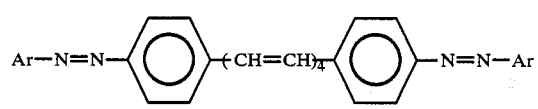
Bisazo Compound No.     Ar
68
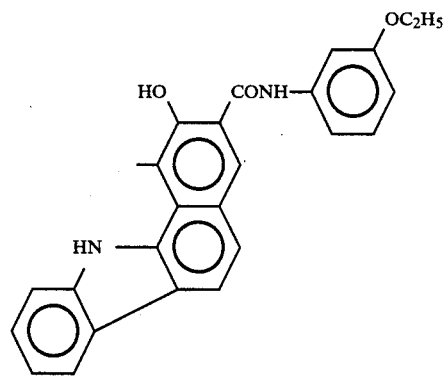
69
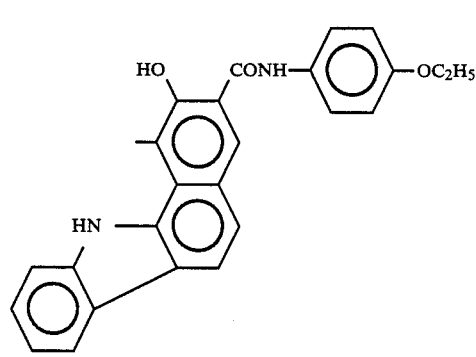
70
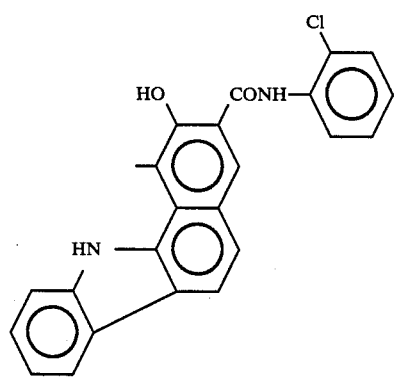
TABLE 1-continued
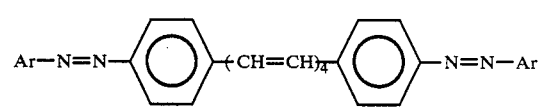
Bisazo Compound No.     Ar
71
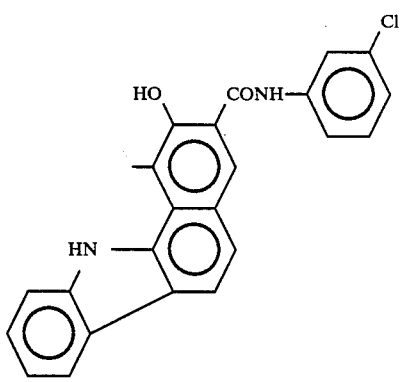
72
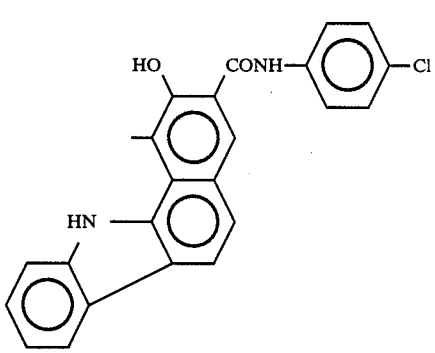
73
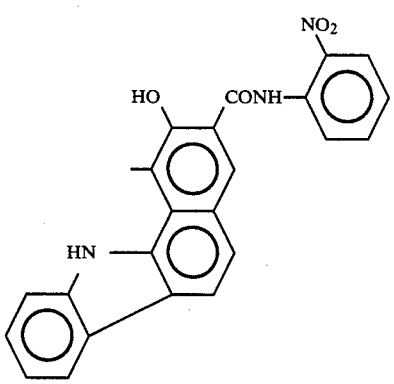

TABLE 1-continued
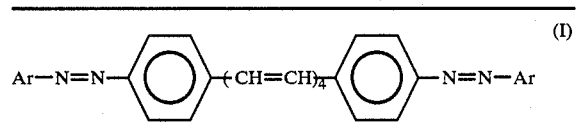
Bisazo Compound No. | Ar
74 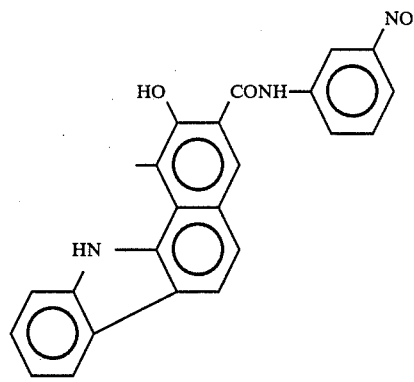
75 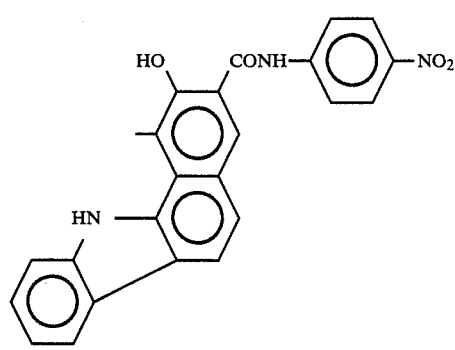
76 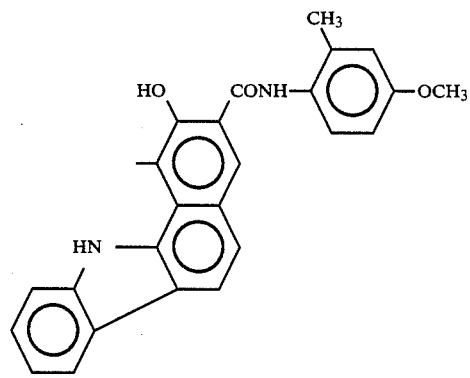
77 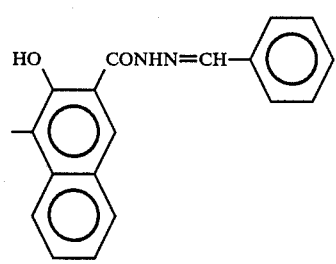
TABLE 1-continued
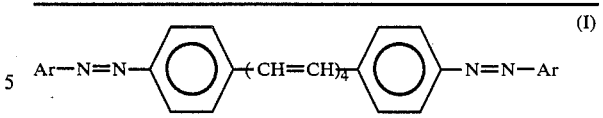
Bisazo Compound No. | Ar
78 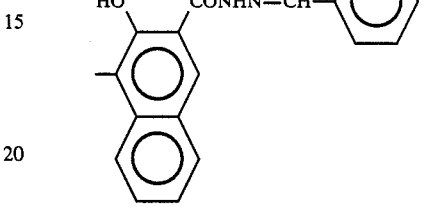
79 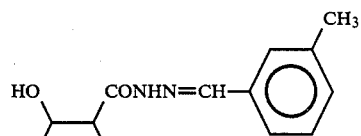
80 
81 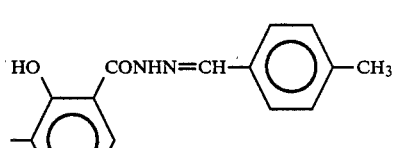
82 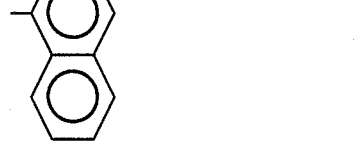

TABLE 1-continued
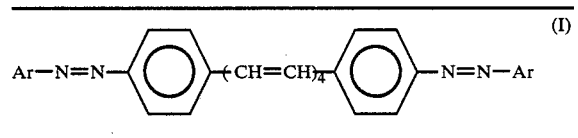
Bisazo Compound No. | Ar
83 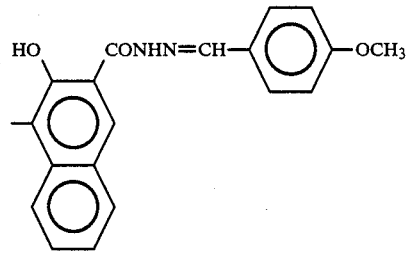
84 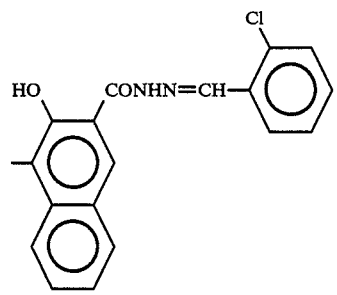
85 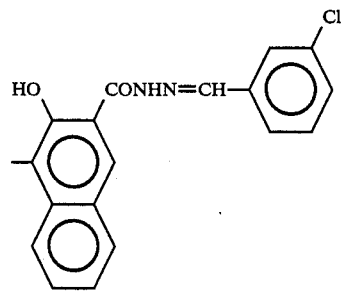
86 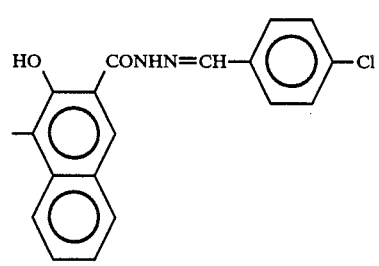
87 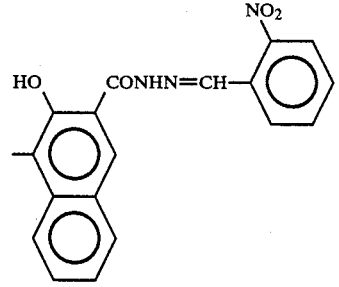
TABLE 1-continued
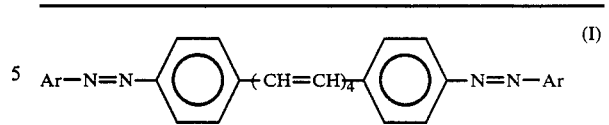
Bisazo Compound No. | Ar
88
89
90
91

TABLE 1-continued
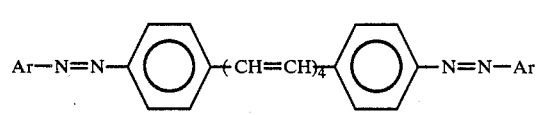
Bisazo Compound No. | Ar
92 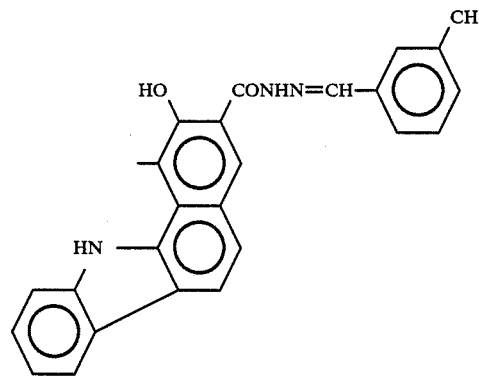
93 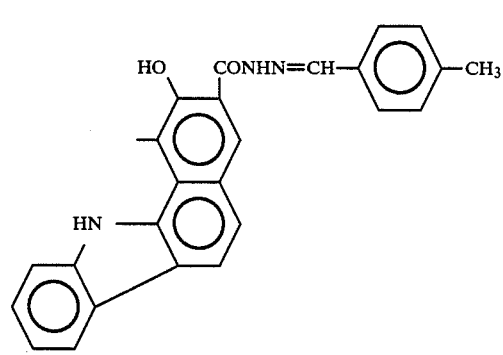
94 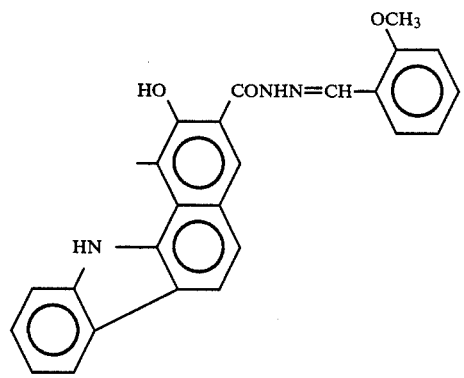
TABLE 1-continued
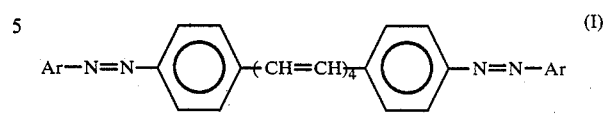
Bisazo Compound No. | Ar
95 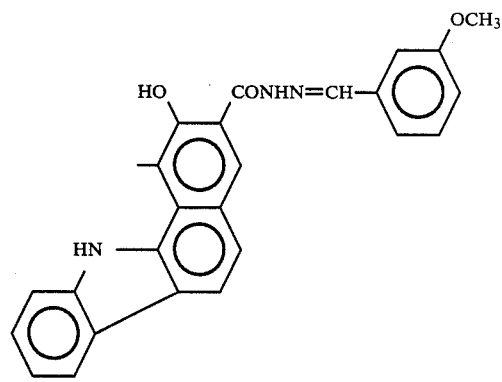
96 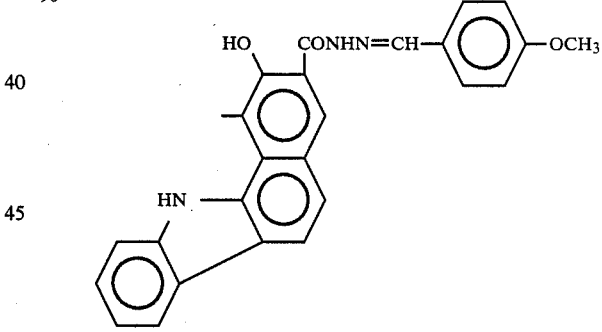
97 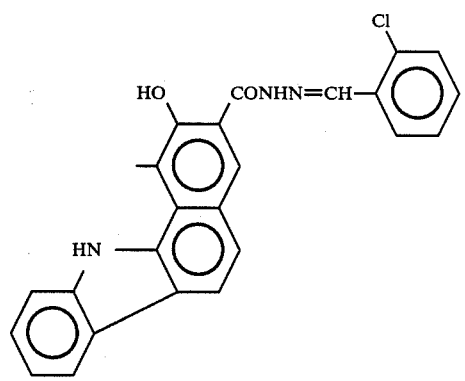

TABLE 1-continued
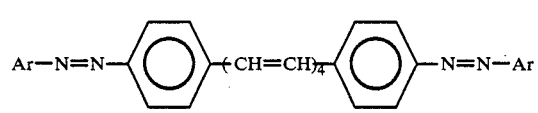
Bisazo Compound No. | Ar
98 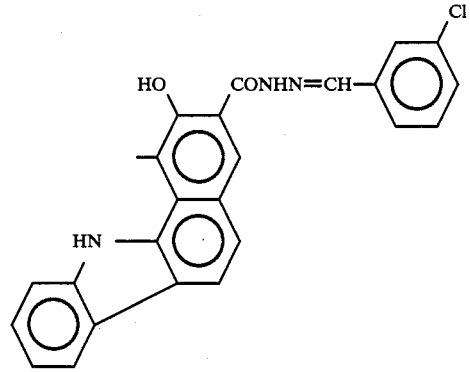
99 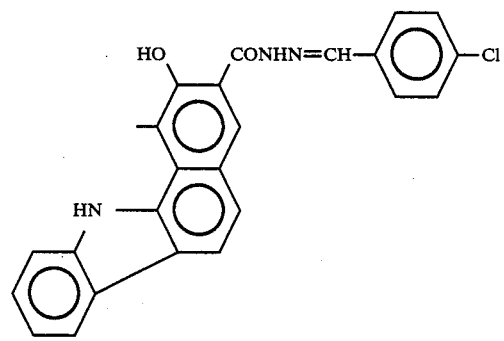
100 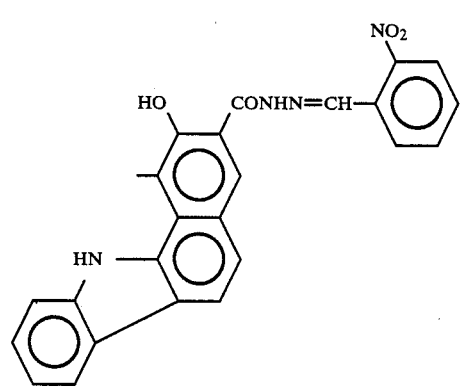
TABLE 1-continued
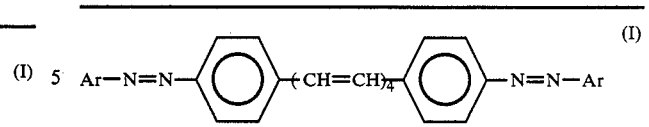
Bisazo Compound No. | Ar
101 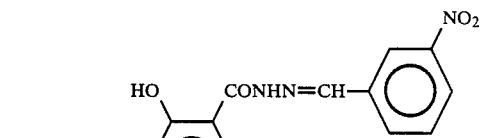
102 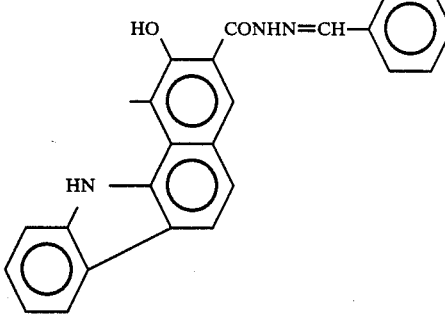
103 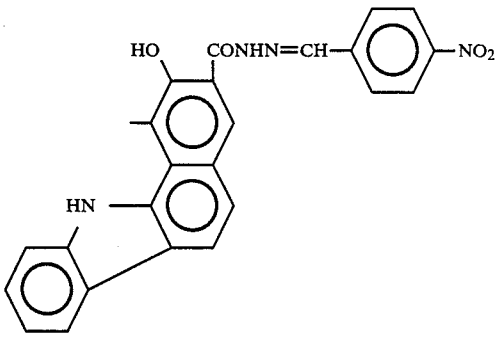
104 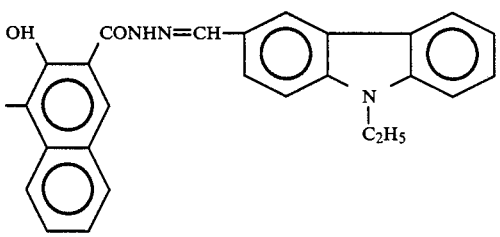
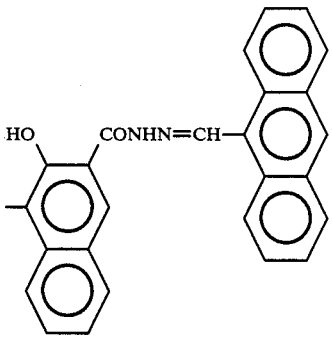

TABLE 1-continued
$$Ar-N=N-\underset{}{\bigcirc}-(CH=CH)_2-\underset{}{\bigcirc}-N=N-Ar \qquad (I)$$
| Bisazo Compound No. | Ar |
|---|---|
| 105 | 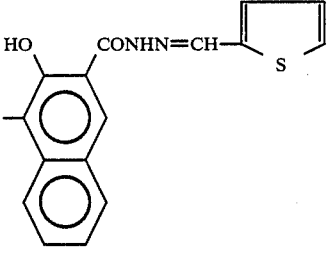 |
| 106 | 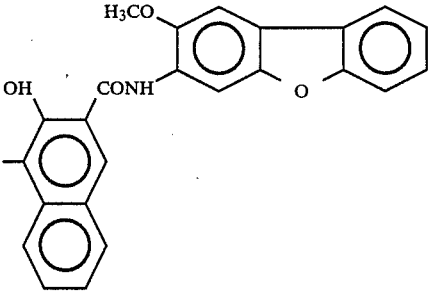 |
| 107 | 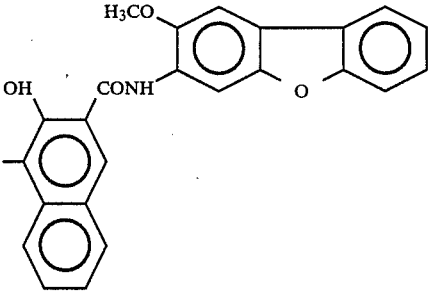 |
| 108 | 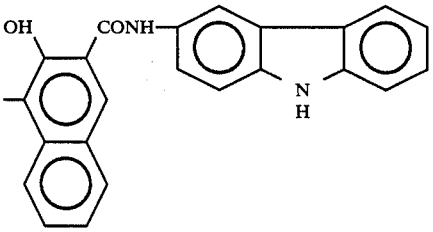 |
| 109 | 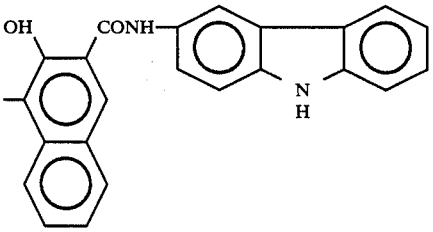 |
| 110 | 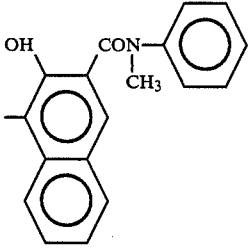 |
| 111 | 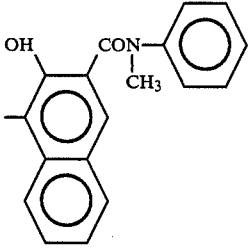 |
| 112 | 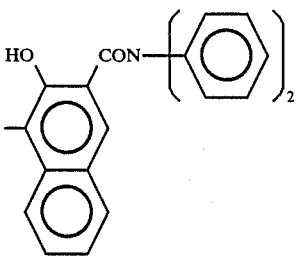 |
| 113 | 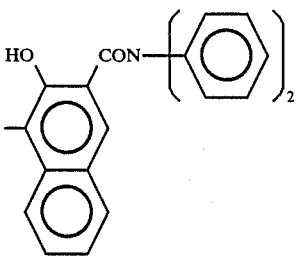 |

TABLE 1-continued
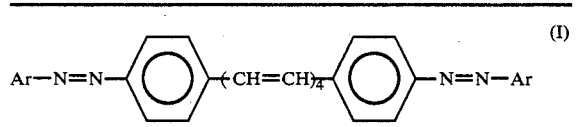
Bisazo Compound No. | Ar
---|---
114 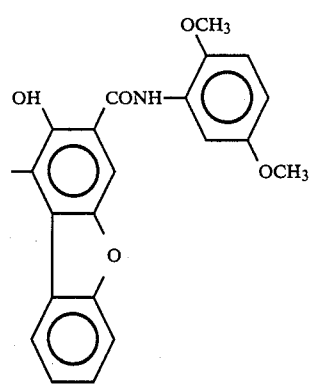
115 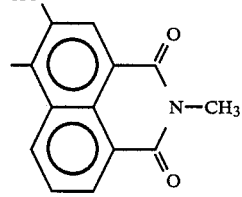
116 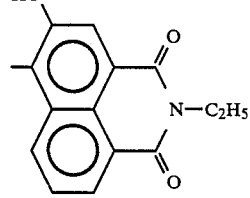
117 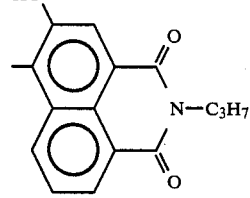
118 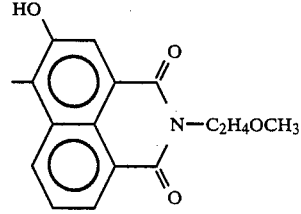
TABLE 1-continued
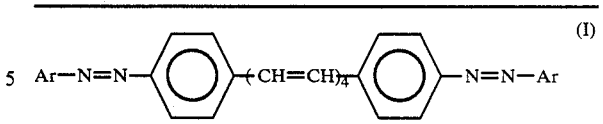
Bisazo Compound No. | Ar
---|---
119 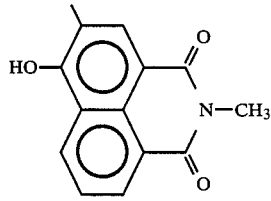
120 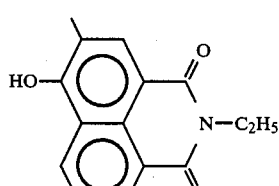
121 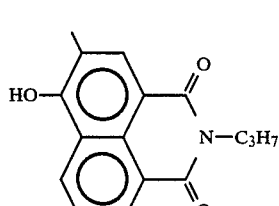
122 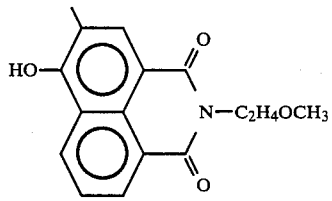
123 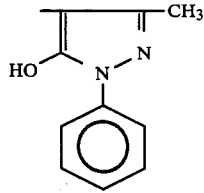
124 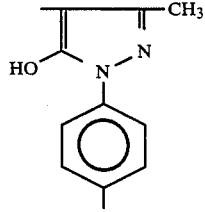

TABLE 1-continued
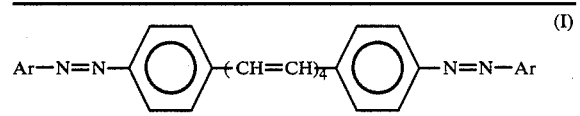
Bisazo Compound No. | Ar
---|---
125 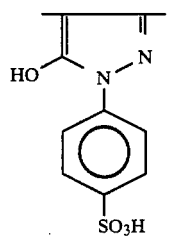
126 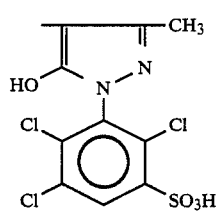
127 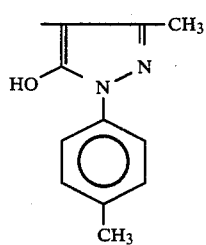
128 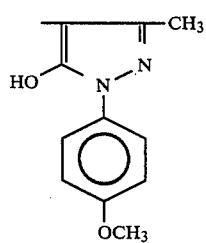
129 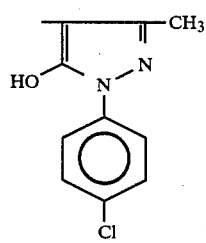
130 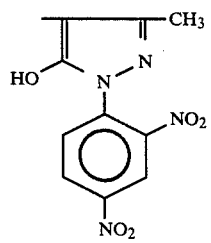
TABLE 1-continued
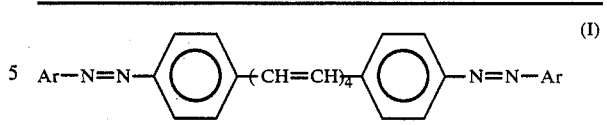
Bisazo Compound No. | Ar
---|---
131 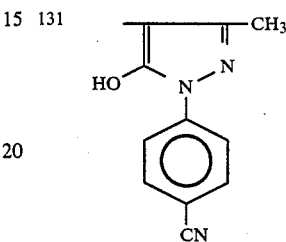
132 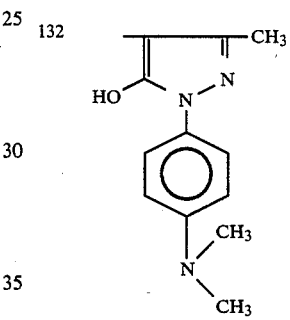
133 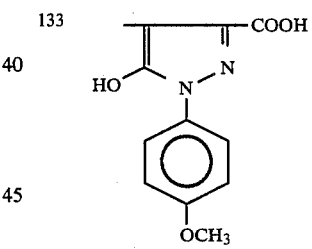
134 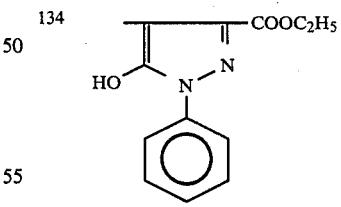
135 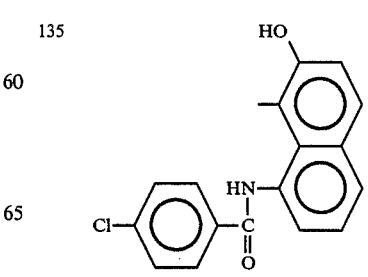

TABLE 1-continued $$Ar-N=N-\underset{}{\underset{}{\bigcirc}}-(CH=CH)_4-\underset{}{\underset{}{\bigcirc}}-N=N-Ar \quad (I)$$

| Bisazo Compound No. | Ar |
|---|---|
| 136 | 2-hydroxy-3-methyl-1-naphthyl with NHCO-(2-naphthyl) |
| 137 | 2-hydroxy-3-methyl-1-naphthyl with NHCO-C6H4-N(CH3)2 |
| 138 | 2-hydroxy-3-methyl-1-naphthyl with NHCO-C6H4-NO2 (para) |
| 139 | 2-hydroxy-3-methyl-1-naphthyl with NHCO-C6H4-NO2 (meta) |
| 140 | 2-hydroxy-3-methyl-1-naphthyl with NHCO-C6H4-CH3 (meta) |
| 141 | 2-hydroxy-3-methyl-1-naphthyl with NHCO-C6H3(Cl)2 (2,4-dichloro) |
| 142 | 2-hydroxy-3-methyl-1-naphthyl with N(CH3)CO-C6H5 |
| 143 | 2-hydroxy-3-methyl-1-naphthyl with N(CH3)CO-C6H4-Cl |
| 144 | 2-hydroxy-3-methyl-1-naphthyl with N(C2H5)CO-C6H5 |

TABLE 1-continued
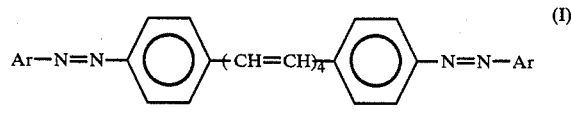
(I)
Bisazo Compound No.    Ar
145
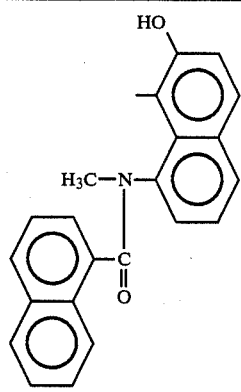
146
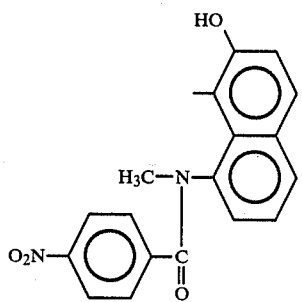
147
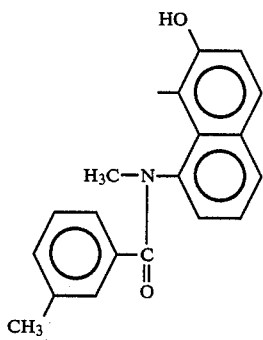
148
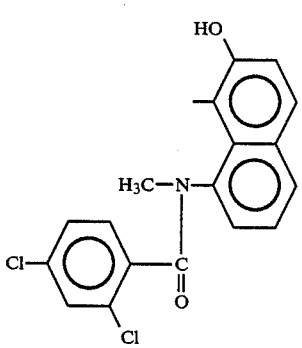
TABLE 1-continued
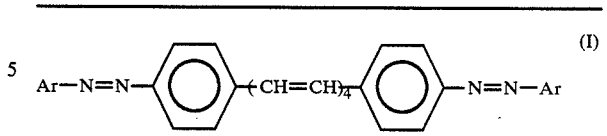
(I)
Bisazo Compound No.    Ar
149
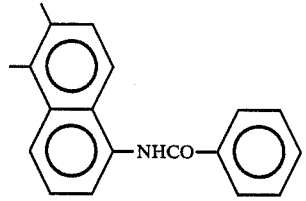
150
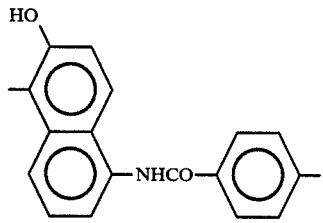
151
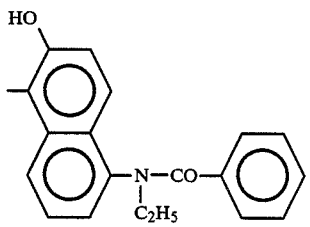
152
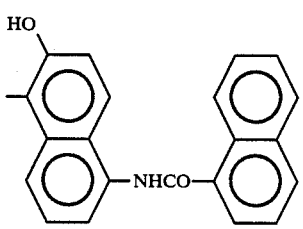
153
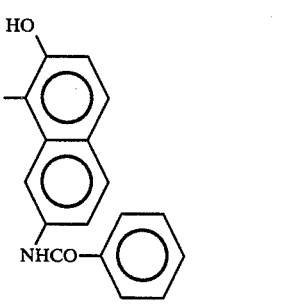

TABLE 1-continued
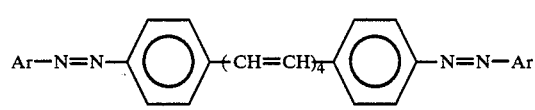
(I)
Bisazo Compound No.    Ar
154 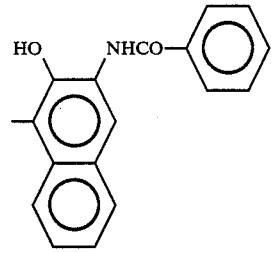
155 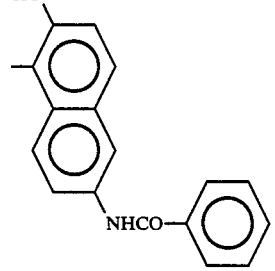
156 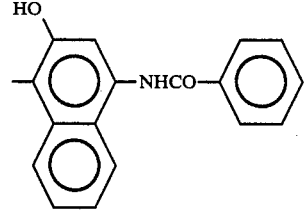
157 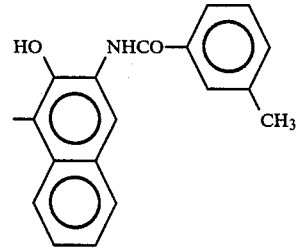
158 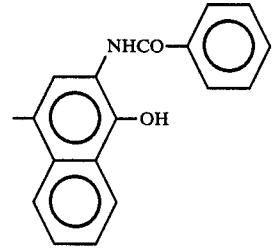
TABLE 1-continued
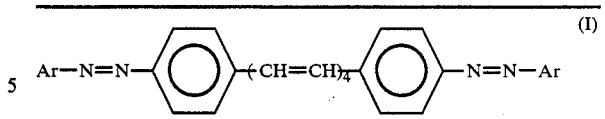
(I)
Bisazo Compound No.    Ar
159 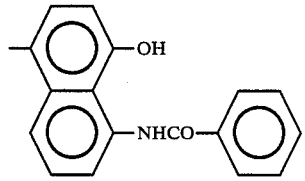
160 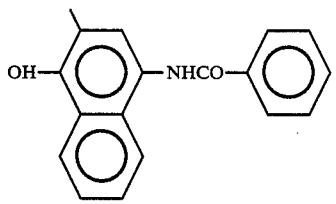
161 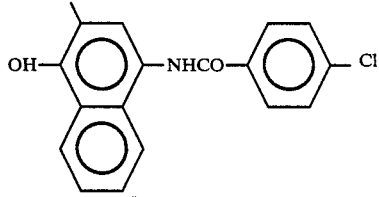
162 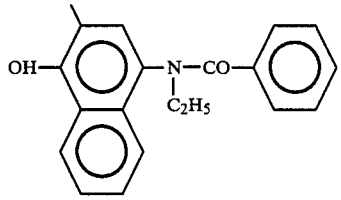
163 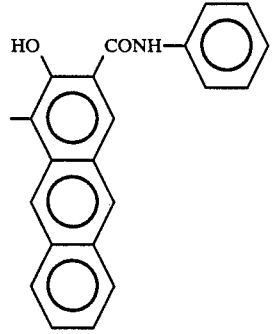
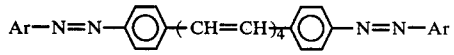
The above bisazo compounds of formula (I) can be prepared by reacting a tetrazonium salt of the following formula (II) with any of the couplers represented by the previously given general formula (III), ArH, by the conventional coupling reaction.

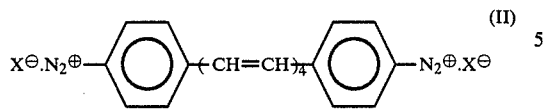

(II)

wherein $X^\ominus$ represents an anionic functional group, preferably one selected from the group consisting of $Cl^\ominus$, $Br^\ominus$, $I^\ominus$, $BF_4^\ominus$, $PF_6^\ominus$, $B(C_6H_5)_4^\ominus$, $ClO_4^\ominus$, $SO_4^{2\ominus}$,

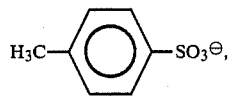

$AsF_6^\ominus$, and $SbF_6^\ominus$.

The tetrazonium salt for preparing the above bisazo compound can be prepared, for example, by reducing 1,8-bis(4-nitrophenyl)-1,3,5,7-octatetraene to obtain 1,8-bis (4-aminophenyl)-1,3,5,7-octatetraene and then by subjecting the 1,8-bis(4-aminophenyl)-1,3,5,7-octatetraene to diazotization by the conventional method to prepare the tetrazonium salt having the above formula (II). The thus prepared tetrazonium salt is coupled with an appropriate coupler in an organic solvent such as N,N-dimethylformamide in the presence of a base, whereby a bisazo compound of the above formula (I) can be prepared.

The 1,8-bis(4-nitrophenyl)-1,3,5,7-octatetraene employed in the above can be prepared by the so-called Wittig reaction in which 4-nitrocinnamyltriphenylphosphonium bromide is caused to condense with 5-(4-nitrophenyl)-2,4-pentadienal-1 in the presence of a basic catalyst. The thus prepared 1,8-bis(4-nitrophenyl)-1,3,5,7-octatetraene contains 3-mono-cis isomers but it can be converted to an all-trans type by heating the product, either in a crude form or in a purified form, in an aromatic hydrocarbon solvent such as toluene and xylene in the presence of a catalytic amount of iodide.

By reducing the thus obtained 1,8-bis(4-nitrophenyl)-1,3,5,7-octatetraene in an organic solvent in the presence of a reducing agent such as a mixture of iron and hydrochloric acid or a mixture of stannous chloride and hydrochloric acid, 1,8-bis(4-aminophenyl)-1,3,5,7-octatetraene can be prepared. This reduction reaction terminates within a period of about 30 minutes to 3 hours when the reaction temperature is elevated to 70~120° C. When an iron-hydrochloric acid reducing agent is employed, it is preferable to perform the reduction reaction in an organic solvent such as N,N-dimethylformamide (hereinafter referred to DMF).

The above obtained 1,8-bis(4-nitrophenyl)-1,3,5,7-octatetraene and 1,8-bis(4-aminophenyl)-1,3,5,7-octatetraene are both novel compounds.

Diazotization of the thus prepared 1,8-bis(4-aminophenyl)-1,3,5,7-octatetraene is conducted as follows: 1,8-bis(4-aminophenyl)-1,3,5,7-octatetraene is added to a diluted inorganic acid such as diluted hydrochloric acid or diluted sulfuric acid. To this mixture is added an aqueous solution of sodium nitrite, while maintaining the temperature of the reaction mixture in the range of $-10°$ C.~$20°$ C. This diazotization reaction terminates within about 30 minutes to 3 hours. It is preferable that the diazonium compound of 1,8-bis(4-aminophenyl)-1,3,5,7-octatetraene be separated in the form of tetrazonium salt by adding, for example, an aqueous solution of borofluoric acid or sodium borofluoride to the reaction mixture to precipitate the tetrazonium salt.

SYNTHESIS EXAMPLE 1

Preparation of all-trans 1,8-bis(4-nitrophenyl)-1,3,5,7-octatetraene 31.5 g of 4-nitrocinnamiltriphenylphosphonium bromide and 12.7 g of 5-(4-nitrophenyl)-2,4-pentadienal-1 were added in a mixed solvent consisting of 510 ml of dried methanol and 64 ml of dried DMF. To this mixture, 15.6 g of a 28% methanol solution of sodium methoxide was added dropwise in a stream of nitrogen, with stirring, over a period of 2 hours. The reaction mixture was then stirred at room temperature for 6 hours. Thereafter, 300 ml of a 50% aqueous methanol solution was added to the reaction mixture. As a result, precipitates were formed in the reaction mixture. The precipitates were collected by filtration and were then washed with water and dried, whereby 19.9 g of a crude 1,8-bis(4-nitrophenyl)-1,3,5,7-octatetraene containing 3-mono-cis isomers was obtained. The thus obtained crude product was refluxed in 500 ml of xylene in the presence of a catalytic amount of iodide, so that all-trans 1,8-bis (4-nitrophenyl)-1,3,5,7-octatetraene was obtained in the form of dark red needles. The yield was 14.9 g (69%) and the melting point was 238.5~240.5° C.

The results of the elemental analysis of the thus obtained 1,8-bis(4-nitrophenyl)-1,3,5,7-octatetraene were as follows:

|  | % C | % H | % N |
| --- | --- | --- | --- |
| Found | 68.77 | 4.63 | 7.91 |
| Calculated | 68.95 | 4.64 | 8.04 |

The above calculation was based on the formula for 1,8-bis(4-nitrophenyl)-1,3,5,7-octatetraene of $C_{20}H_{16}N_2O_4$.

The maximum adsorption wavelength ($\gamma_{max}$) of the product in DMF by visible light spectrum was 439 nm.

An infrared spectrum of the 1,8-bis(4-nitrophenyl)-1,3,5,7-octatetraene, taken by use of a KBr pellet, indicated absorption bands at 1510 cm$^{-1}$ and 1335 cm$^{-1}$ which are characteristic of the stretching vibrations of the nitro groups and absorption bands at 1010 cm$^{-1}$ and 950 cm$^{-1}$ which are characteristic of the out-of-plane deformation vibrations of the trans olefin as shown in FIG. 1.

SYNTHESIS EXAMPLE 2

Preparation of all-trans 1,8-bis(4-aminophenyl)-1,3,5,7-octatetraene 11.28 g of the 1,8-bis(4-nitrophenyl)-1,3,5,7-octatetraene synthesized in Synthesis Example 1 was added to 250 ml of DMF. To this mixture, 22.5 g of iron powder was added, and then diluted hydrochloric acid consisting of 5.6 ml of concentrated hydrochloric acid and 19 ml of water was added with stirring. The mixture was further stirred at 80~88° C. for 5 hours. The reaction mixture was cooled to 50° C. and was made alkaline by addition of a 10% aqueous solution of sodium hydroxide. Celite was added to the reaction mixture, and then insoluble components were filtered out, together with the Celite, from the reaction mixture, while it was hot. The filterate was diluted with water. As a result, crystals separated out. The crystals were filtered off, washed with water and dried, so that a crude diamino product was obtained. The product was recrystallized from a mixed solvent of DMF and water, whereby 1,8-bis(4-aminophenyl)-1,3,5,7-octatetraene was obtained in the form of dark red plate crystals. The melting point was 262.5~264.5° C.

The results of the elemental analysis of the thus obtained 1,8-bis(4-aminophenyl)-1,3,5,7-octatetraene were as follows:

|  | % C | % H | % N |
|---|---|---|---|
| Found | 83.01 | 7.02 | 9.75 |
| Calculated | 83.28 | 7.00 | 9.71 |

The above calculation was based on the formula for 1,8-bis(4-aminophenyl)-1,3,5,7-octatetraene of $C_{20}H_{20}N_2$.

Figure 2:
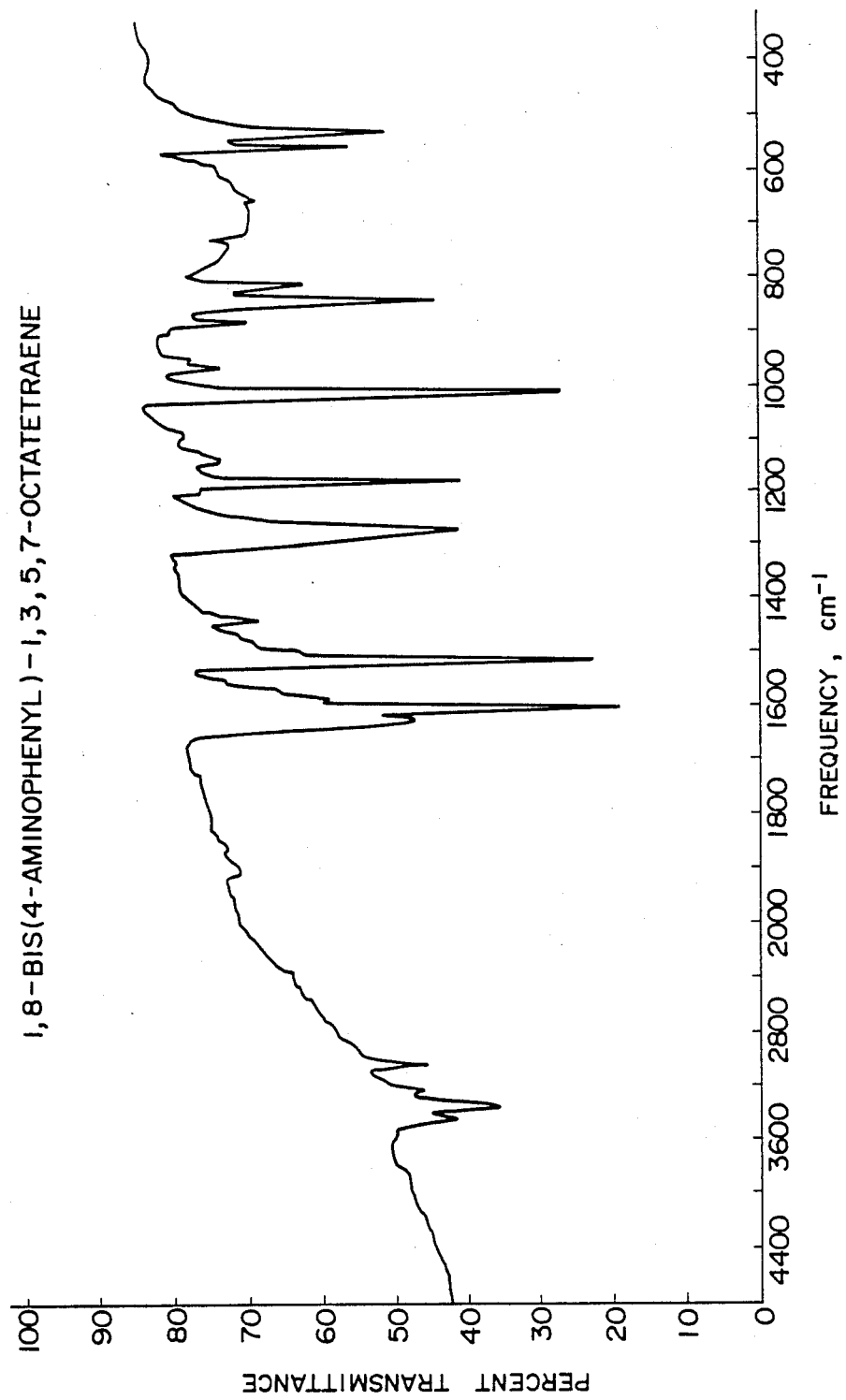
FIG. 2 is an infrared spectrum of a diamino compound which is a first intermediate for producing a bisazo compound according to the present invention.

An infrared spectrum of the 1,8-bis(4-aminophenyl)-1,3,5,7-octatetraene, taken by use of a KBr pellet, indicated absorption bands at 3450~3200 cm$^{-1}$ which are characteristic of the stretching vibrations of the primary amine and absorption bands at 1010 cm$^{-1}$ and 955 cm$^{-1}$ which are characteristic of the out-of-plane deformation vibrations of the trans olefin as shown in FIG. 2.

SYNTHESIS EXAMPLE 3

Preparation of Tetrazonium Salt of Formula (II)

6.1 g of the 1,8-bis(4-aminophenyl)-1,3,5,7-octatetraene synthesized in Syenthesis Example 2 was added to a diluted sulfuric acid consisting of 7.2 ml of concentrated sulfuric acid and 100 ml of water. The mixture was stirred at 60° C. for 2 hours and was then cooled to −2° C. To this mixture, an aqueous solution of sodium nitrite consisting of 3.2 g of sodium nitrite and 10 ml of water was added dropwise, with stirring, with the temperature of the reaction mixture maintained at −5° C. to −2° C., over a period of 50 minutes. The reaction mixture was stirred at the same temperatures for another 20 minutes. Thereafter, 400 ml of cold water was added to the reaction mixture. Insoluble components were removed from the reaction mixture by filtration. A 42% aqueous solution of boron hydride was added to the filtrate. As a result, crystals separated out in the filtrate. The crystals were filtered off and dried, whereby a tetrazonium salt of Formula (II) was obtained in the form of dark red crystals. The yield was 8.4 g (82%).

Figure 3:
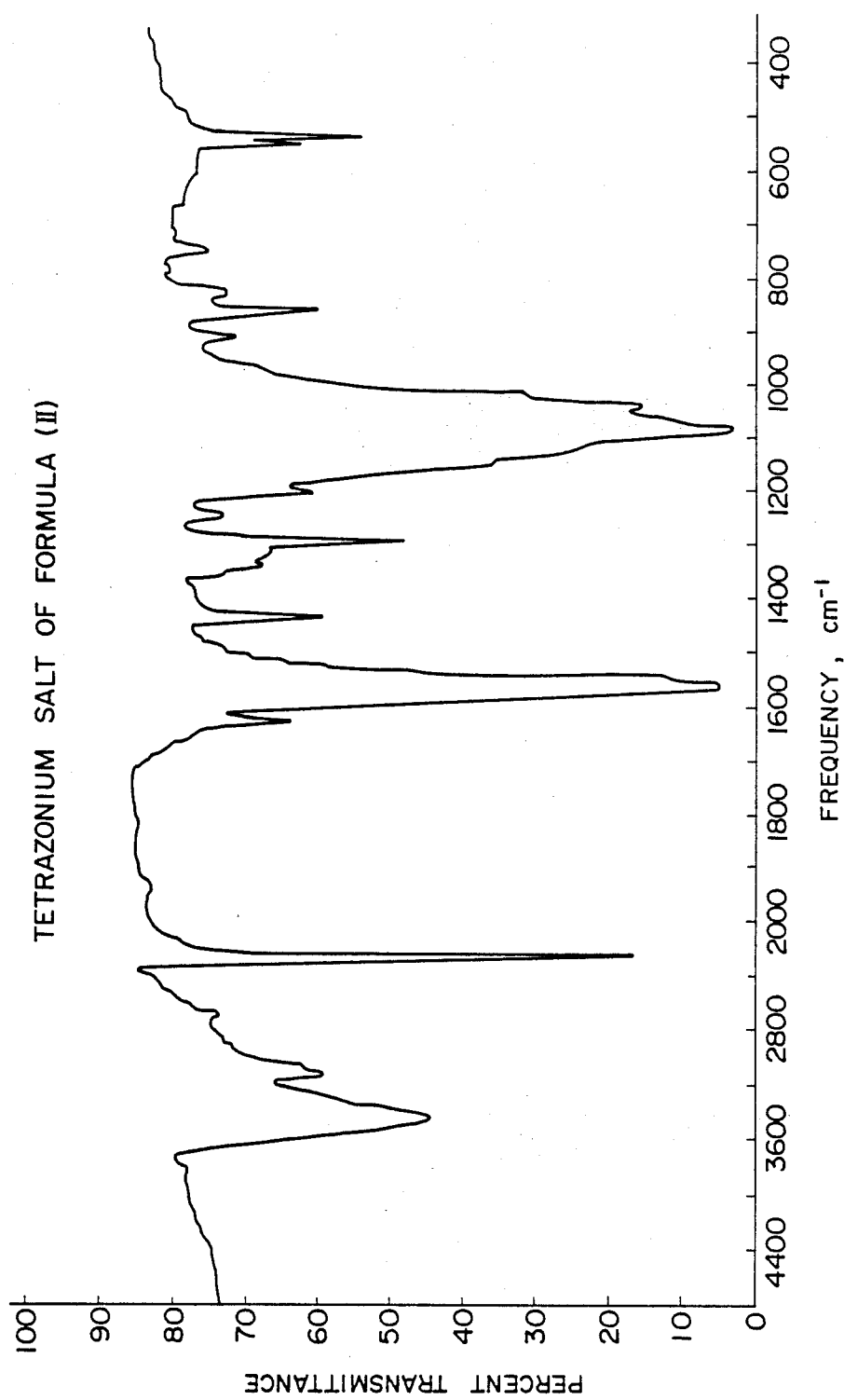
FIG. 3 is an infrared spectrum of a tetrazonium salt which is a second intermediate for producing a bisazo compound according to the present invention.

An infrared spectrum of the thus obtained tetrazonium salt, taken by use of a KBr pellet, indicated an absorption band at 2230 cm$^{-1}$ which is characteristic of the stretching vibrations of the diazonium salt as shown in FIG. 3.

SYNTHESIS EXAMPLE 4-1

Preparation of Bisazo Compound No. 1 in Table 1

0.55 g of 2-hydroxy-3-naphthoic acid anilide (a coupler) was dissolved in 200 ml of DMF. To this solution, 0.49 g of the tetrazonium salt prepared in Synthesis Example 3 was added. To this mixture, an aqueous solution of sodium acetate consisting of 0.34 g of sodium acetate and 4 ml of water was added dropwise over a period of 20 minutes, while the temperature of the reaction mixture was maintained at room temperature. After the dropwise addition of the aqueous solution sodium acetate, the reaction mixture was stirred at room temperature for 3 hours. Precipitates were formed. The precipitates were collected by filtration and were then washed with DMF five times, using 250 ml thereof at each time. The precipitates were then washed with water two times, using 250 ml thereof at each time. The thus purified precipitates were then dried under reduced pressure, with application of heat thereto, whereby Bisazo Compound No. 1, 1,8-bis[4-(2-hydroxy-3-phenylcarbamoylnaphthyl-1-azo)-phenyl]-1,3,5,7-octatetraene, shown in Table 1 was obtained in the form of bluish black powder. The yield was 0.72 g (82%) and the decomposition point was 276° C.

The results of the elemental analysis of the thus obtained Bisazo Compound No. 1, 1,8-bis[4(2-hydroxy-3-phenylcarbamoynaphthyl-1-azo) phenyl]-1,3,5,7-octatetraene were as follows:

|  | % C | % H | % N |
|---|---|---|---|
| Found | 77.44 | 4.72 | 9.87 |
| Calculated | 77.48 | 4.83 | 10.04 |

The above calculation was based on the formula for Bisazo Compound No. 1, 1,8-bis[4-(2-hydroxy-3-phenyl-carbamoylnaphthyl-1-azo) phenyl]-1,3,5,7-octatetraene of $C_{54}H_{40}N_6O_4$.

The maximum adsorption wavelength ($\lambda_{max}$) of Bisazo Compound No. 1 in a mixed solvent of ethylenediamine/DMF(1/9 by volume) by visible light spectrum was 596 nm.

Figure 4:
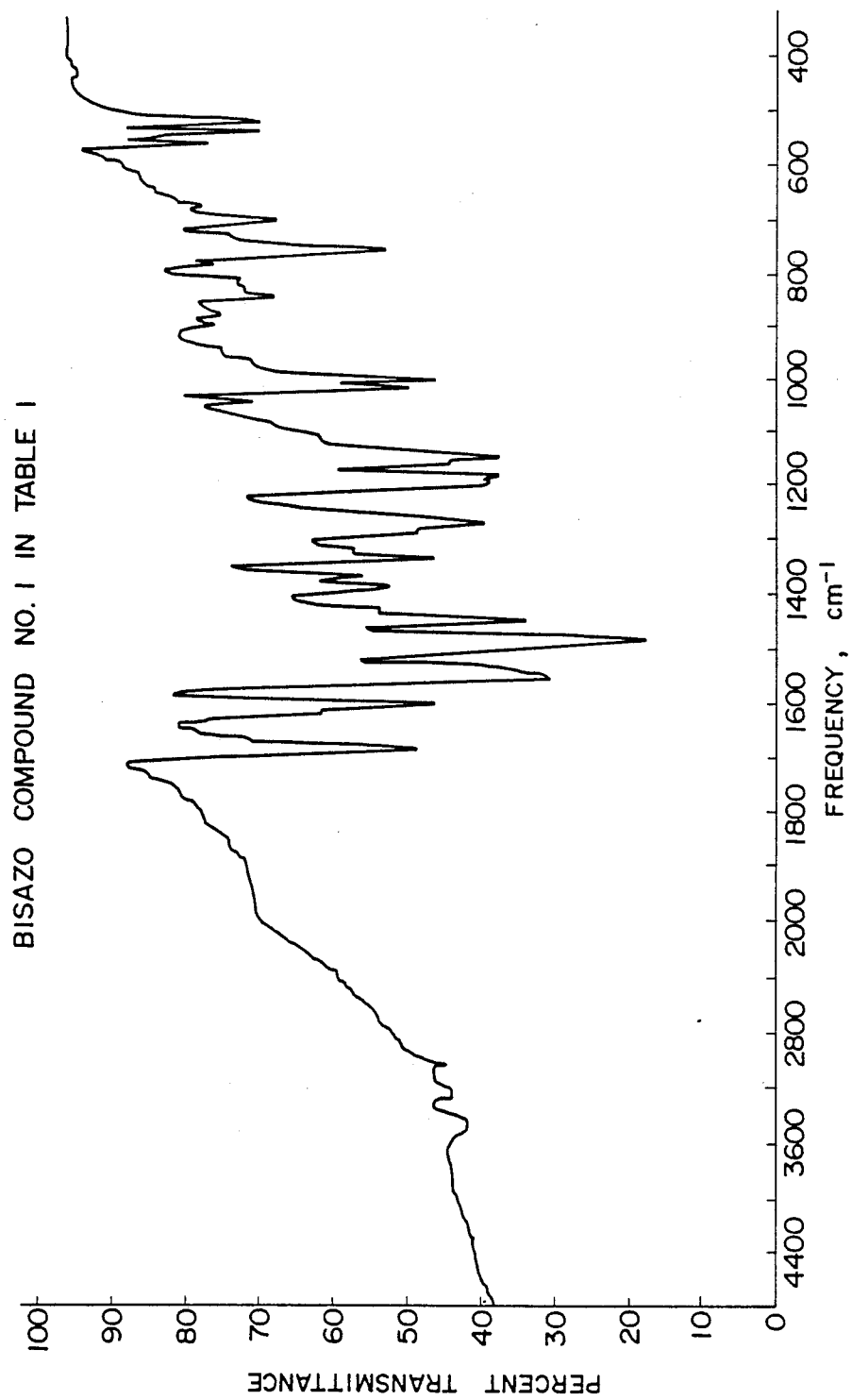
FIGS. 4 through 7 are respectively infrared spectra of Bisazo Compound No. 1, Bisazo Compound No. 58, Bisazo Compound No. 163 and Bisazo Compound No. 72 according to the present invention.

An infrared spectrum of Bisazo compound No. 1, taken by use of a KBr pellet, indicated an absorption band at 1675 cm$^{-1}$ which is characteristic of the stretching vibrations of C=O and an absorption band at 995 cm$^{-1}$ which is characteristic of the out-of-plane deformation vibrations of the trans olefin as shown in FIG. 4.

SYNTHESIS EXAMPLE 4-2

Preparation of Bisazo Compound No. 58 Table 1

1.11 g of 2-hydroxy-3-phenylcarbamoly-11H-benzo carbazole (a coupler) was dissolved in 200 ml of DMF. To this solution, 0.73 g of the tetrazonium salt prepared in Synthesis Example 3 was added. To this mixture, an aqueous solution of sodium acetate consisting of 0.52 g of sodium acetate and 5 ml of water was added dropwise over a period of 30 minutes, while the temperature of the reaction mixture was maintained at room temperature. After the dropwise addition of the aqueous solution of sodium acetate, the reaction mixture was stirred at room temperature for 3 hours. Precipitates were formed. The precipitates were collected by filtration and were then washed with DMF five times, using 300 ml thereof at each time. The precipitates were then washed with water two times, using 300 ml thereof at each time. The thus purified precipitates were then dried under reduced pressure, with application of heat thereto, whereby Bisazo Compound No. 58, 1,8-bis [4-(2-hydroxy-3-phenylcarbamoyl-11H-benzo [a]carbazolyl-1-azo) phenyl]-1,3,5,7-octatetraene, shown in Table 1 was obtained in the form of bluish black powder. The yield was 1.37 g (90%) and the decomposition point was 305° C.

The results of the elemental analysis of the thus obtained Bisazo Compound No. 58, 1,8-bis [4-(2-hydroxy-3-phenylcarbamoyl-11H-benzo [a]carbolyl-1-azo) phenyl ]-1,3,5,7-octatetraene, were as follows:

|  | % C | % H | % N |
|---|---|---|---|
| Found | 77.77 | 4.45 | 10.78 |
| Calculated | 78.08 | 4.58 | 11.04 |

The above calculation was based on the formula for Bisazo Compound No. 58, 1,8-bis [4(2-hydroxy-3-phenylcarbamoyl-11H-benzo [a]carbazolyl-1-azo) phenyl]-1,3,5,7-octatetraene of $C_{66}H_{46}N_8O_4$.

The maximum adsorption wavelength ($\lambda_{max}$) of Bisazo Compound No. 58 in a mixed solvent of ethylenediamine/DMF(1/9 by volume) by visible light spectrum was 620 nm.

Figure 5:
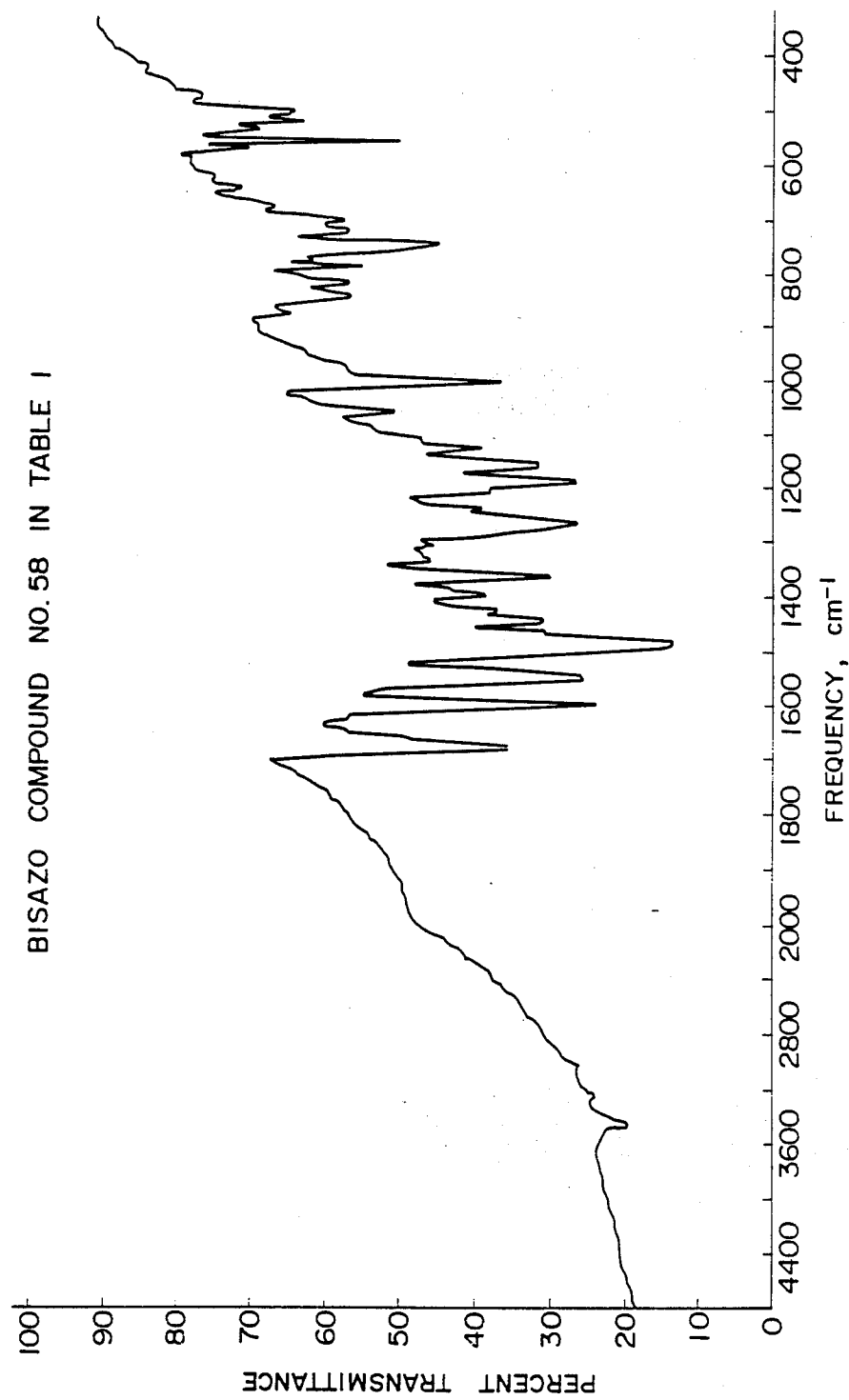

An infrared spectrum of Bisazo compound No. 58, taken by use of a KBr pellet, indicated an absorption band at 3450 cm$^{-1}$ which is characteristic of the stretching vibrations of the carbazole NH and an absorption band at 1000 cm$^{-1}$ which is characteristic of the out-of-plane deformation vibrations of the trans olefin as shown in FIG. 5.

SYNTHESIS EXAMPLE 43

Preparation of Bisazo Compound No. 163 in Table 1

0.66 g of 2-hydroxy-3-phenylcarbamolyanthracene (a coupler) was dissolved in 200 ml of DMF. To this solution, 0.49 g of the tetrazonium salt prepared in Synthesis Example 3 was added. To this mixture, an aqueous solution of sodium acetate consisting of 0.34 g of sodium acetate and 4 ml of water was added dropwise over a period of 20 minutes, while the temperature of the reaction mixture was maintained at room temperature. After the dropwise addition of the aqueous solution of sodium acetate, the reaction mixture was stirred at room temperature for 3 hours. Precipitates were formed. The precipitates were collected by filtration and were then washed with DMF four times, using 250 ml thereof at each time. The precipitates were then washed with water two times, using 250 ml thereof at each time. The thus purified precipitates were then dried under reduced pressure, with application of heat thereto, whereby Bisazo Compound No. 163, 1,8-bis [4-(2-hydroxy-3-phenylcarbamoylanthryl-1-azo)-pheyl]-1,3,5,7-octatetraene, shown in Table 1 was obtained in the form of bluish black powder. The yield was 0.81 g (86%) and the decomposition point was 287° C.

The results of the elemental analysis of the thus obtained Bisazo Compound No. 163, 1,8-bis [4-(2-hydroxy-3-phenylcarbamoylanthryl-1-azo) phenyl]-1,3,5,7-octatetraene were as follows:

|  | % C | % H | % N |
|---|---|---|---|
| Found | 79.20 | 4.48 | 8.74 |
| Calculated | 79.46 | 4.74 | 8.97 |

The above calculation was based on the formula for Bisazo Compound No. 163, 1,8-bis [4-(2-hydroxy-3-phenylcarbamoylanthryl-1-azo) phenyl]-1,3,5,7-octatetraene of $C_{62}H_{44}N_6O_4$.

The maximum adsorption wavelength ($\lambda_{max}$) of Bisazo Compound No. 163 in a mixed solvent of ethylenediamine/DMF(1/9 by volume) by visible light spectrum was 634 nm.

Figure 6:
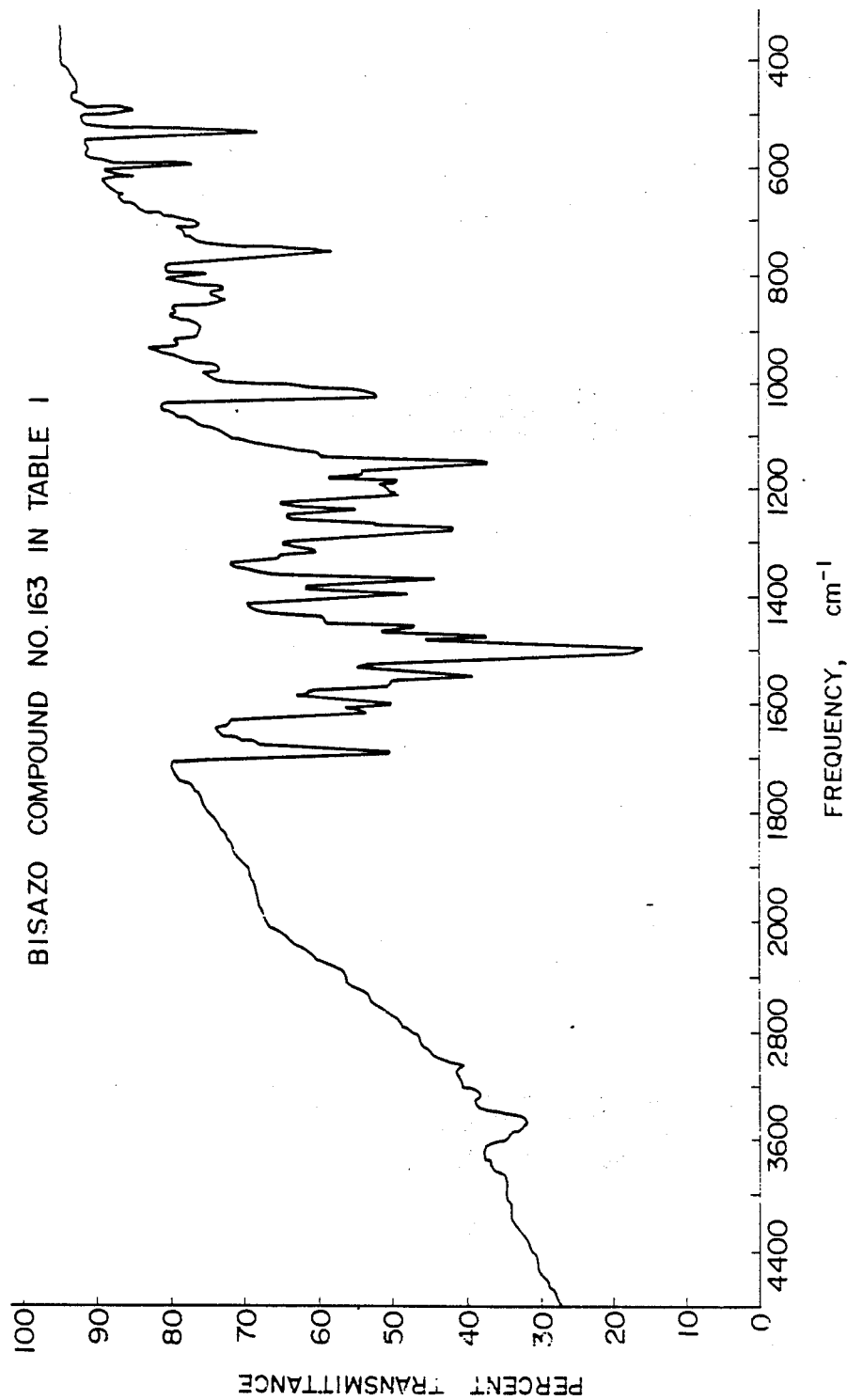

An infrared spectrum of Bisazo compound No. 163, taken by use of a KBr pellet, indicated an absorption band at 1680 cm$^{-1}$ which is characteristic of the stretching vibrations of C=O and absorption bands at 1010 cm$^{-1}$ and 960 cm$^{-1}$ which are characteristic of the out-of-plane deformation vibrations of the trans olefin as shown in FIG. 6.

EXAMPLES 4-4~4-27

Figure 7:
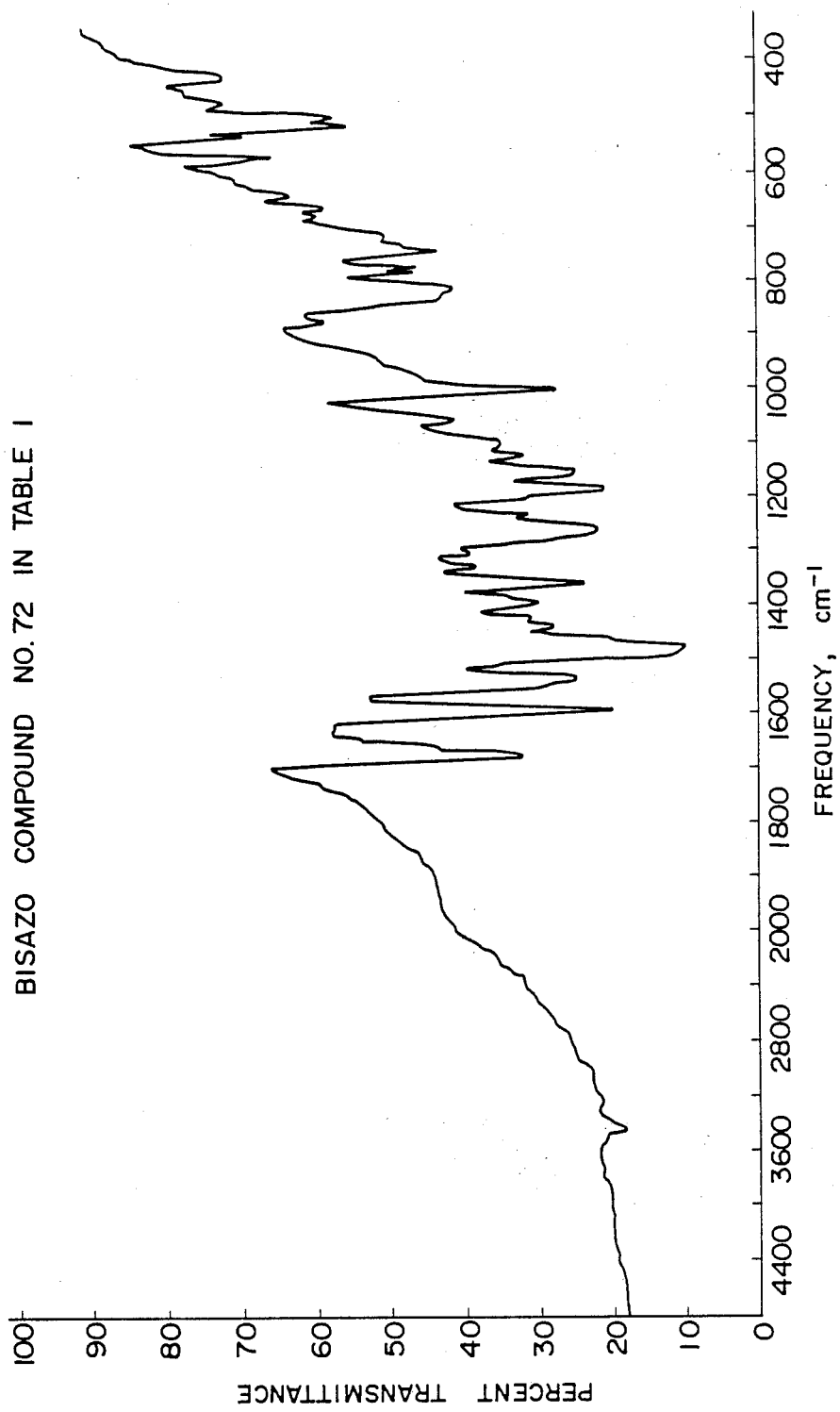

Example 4-1 was repeated except that the coupler employed in Example 4-1 was replaced by the couplers as listed in Table 2, whereby Bisazo Compounds Nos. 4, 8, 10, 16, 33, 34, 38, 42, 44, 45, 58, 59, 60, 61, 63, 64, 65, 70, 71, 72, 73, 74, 75, and 76 were prepared, which bisazo compounds are listed in Table 2. FIG. 7 shows an infrared spectrum of Bisazo Compound No. 72.

TABLE 2

| Bisazo Compound No. | Decomposition Point (°C.) | Elemental Analysis | | | IR Spectral (KBr pellet) (cm$^{-1}$) | | |
|---|---|---|---|---|---|---|---|
| | | % O | % H | % N | C=O | Trans-OH= | |
| 1 | 276 | 77.44 | 4.72 | 9.87 | 1675 | 1015 | 995 |
|  |  | (77.48) | (4.83) | (10.04) |  |  |  |
| 2 | 284 | 77.32 | 5.02 | 9.64 | 1680 | 1015 | 1000 |
|  |  | (77.75) | (5.14) | (9.72) |  |  |  |
| 4 | 287 | 77.12 | 4.97 | 9.61 | 1675 | 1020 | 1000 |
| 8 | 272 | 74.40 | 5.11 | 9.29 | 1670 | 1015 | 1000 |
|  |  | (74.97) | (4.95) | (9.37) |  |  |  |
| 10 | 284 | 74.20 | 4.75 | 9.18 | 1670 | 1020 | 1000 |
| 16 | 292 | 71.30 | 3.96 | 9.39 | 1675 | 1015 | 1000 |
|  |  | (71.58) | (4.24) | (9.28) |  |  |  |
| 33 | 294 | 69.59 | 3.97 | 11.93 | 1680 | 1015 | 1000 |
|  |  | (69.96) | (4.14) | (12.09) |  |  |  |
| 34 | 299 | 69.25 | 3.83 | 12.29 | 1685 | 1015 | 1000 |
| 38 | 292 | 72.39 | 4.83 | 8.67 | 1670 | 1015 | 1000 |
|  |  | (72.78) | (5.07) | (8.78) |  |  |  |
| 42 | 286 | 71.29 | 4.31 | 8.95 | 1680 | 1015 | 1000 |
| 44 | 280 | 77.55 | 5.28 | 9.43 | 1675 | 1015 | 1000 |
|  |  | (77.99) | (5.43) | (9.41) |  |  |  |
| 45 | 263 | 71.56 | 4.43 | 9.33 | 1680 | 1015 | 1000 |
|  |  | (72.01) | (4.54) | (9.00) |  |  |  |
| 58 | 311 | 77.77 | 4.45 | 10.78 | 1670 | 1000 |  |
|  |  | (78.08) | (4.58) | (11.04) |  |  |  |
| 59 | 293 | 77.91 | 4.92 | 10.52 | 1680 | 1000 |  |
|  |  | (78.28) | (4.84) | (10.73) |  |  |  |
| 60 | 306 | 77.73 | 4.87 | 10.48 | 1680 | 1000 |  |
| 61 | 309 | 77.74 | 4.92 | 10.43 | 1675 | 1000 |  |
| 62 | 304 | 78.06 | 5.03 | 10.20 | 1680 | 1000 |  |
|  |  | (78.47) | (5.09) | (10.46) |  |  |  |
| 63 | 305 | 77.91 | 4.88 | 10.24 | 1670 | 1000 |  |

TABLE 2-continued

| Bisazo Compound No. | Decomposition Point (°C.) | Elemental Analysis | | | IR Spectral (KBr pellet) (cm$^{-1}$) | | |
|---|---|---|---|---|---|---|---|
| | | % O | % H | % N | C=O | Trans-OH= | |
| 64 | 312 | 75.36 | 4.92 | 10.14 | 1670 | 995 | |
| | | (75.95) | (4.70) | (10.42) | | | |
| 65 | 314 | 75.30 | 4.52 | 10.16 | 1680 | 1005 | |
| 66 | 311 | 75.26 | 4.46 | 10.15 | 1670 | 1000 | |
| 70 | 302 | 72.44 | 3.85 | 10.18 | 1680 | 1000 | |
| | | (73.11) | (4.10) | (10.34) | | | |
| 71 | 317 | 73.06 | 3.87 | 10.10 | 1680 | 1000 | |
| 72 | 314 | 72.87 | 4.05 | 10.09 | 1675 | 1000 | |
| 73 | 304 | 71.38 | 3.91 | 12.45 | 1675 | 1000 | |
| | | (71.72) | (4.02) | (12.68) | | | |
| 74 | 318 | 71.50 | 3.78 | 12.25 | 1675 | 995 | |
| 75 | 315 | 71.28 | 3.97 | 12.36 | 1680 | 995 | |
| 76 | 301 | 75.86 | 5.52 | 9.98 | 1670 | 1000 | |
| | | (76.20) | (4.94) | (10.16) | | | |
| 163 | 293 | 79.20 | 4.48 | 8.74 | 1680 | 1010 | 960 |
| | | (79.46) | (4.74) | (8.97) | | | |

Representative electrophotographic photoconductors according to the present invention will now be explained, which contain any of the above-described novel bisazo compounds in the photoconductive layers thereof.

Figure 8:
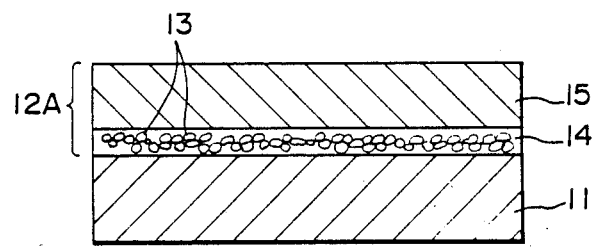
FIG. 8 is a schematic enlarged cross-sectional view of an example of an electrophotographic photoconductor according to the present invention.

Referring to FIG. 8, there is shown an electrophotographic photoconductor comprising an electroconductive support 11 and a photoconductive layer 12A formed thereon, which comprises a charge generating layer 14 consisting essentially of a bisazo compound 13 and a charge transporting layer 15 consisting essentially of a charge transporting material.

In the electrophotographic photoconductor as shown in FIG. 8, light passes through the charge transporting layer 15 and then reaches the charge generating layer 14 where electric charges are generated by the bisazo compound 13. The thus generated electric charges are then injected into the charge transporting layer 15. The charge transporting layer 15 receives the injected electric charges and transports the same. In this photoconductor, the generation of electric charges necessary for the light decay is performed by the bisazo compound 13 and the transport of the electric charges is performed by the charge transporting layer 15.

In the photoconductor as shown in FIG. 8, it is possible to reverse the overlaying order of the charge generating layer 14 and the charge transporting layer 15. It is preferable that the thickness of the charge generating layer 14 be in the range of 0.01 to 5 μm, more preferably in the range of 0.05 to 2 μm, for attaining sufficiently high charge generation, with the residual potential of the photoconductor minimized for use in practice. Further it is preferable that the thickness of the charge transporting layer 15 be in the range of 3 to 50 μm, more preferably in the range of 5 to 20 μm, for attaining sufficiently high charge generation, with the residual potential of the photoconductor minimized for use in practice.

The charge generating layer 14 essentially consists of the bisazo compound having the previously described general formula (I), which may further contain a binder agent and a plasticizer.

It is preferable that the content of the bisazo compound 13 in the charge generating layer 14 be 30 wt. % or more, more preferably 50 wt. % or more.

The charge transporting layer 15 essentially consists of a charge transporting material and a binder agent, which may further contain a plasticizer.

It is preferable that the content of a charge transporting material in the charge transporting layer 15 be in the range of 10 to 95 wt. %, more preferably in the range of 30 to 90 wt. %, for attaining sufficiently high charge transportation and sufficiently high mechanical strength of the charge transporting layer for use in practice.

Figure 9:
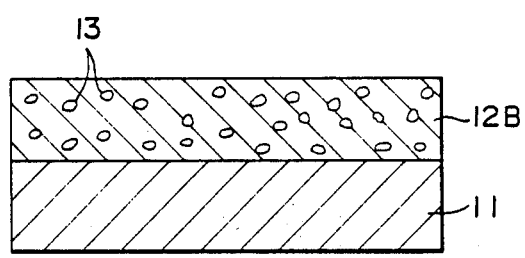
FIG. 9 is a schematic enlarged cross-sectional view of another example of an electrophotographic photoconductor according to the present invention.

FIG. 9 shows another electrophotographic photoconductor comprising an electroconductive support 11, and a photoconductive layer 12B formed thereon, which essentially consists of the bisazo compound 13, a charge transporting material and a resinous binder agent. In this photoconductor, the bisazo compound 13 also works as a charge generating material.

In the photoconductor as shown in FIG. 9, it is preferable that the thickness of the photoconductive layer 12B be in the range of 3 to 50 μm, more preferably in the range of 5 to 20 μm, the content of the bisazo compound 13 in the photoconductive layer 12B be 50 wt. % or less, more preferably 30 wt. % or less, and the content of a charge transporting material in the photoconductive layer 12B be in the range of 10 to 95 wt. %, more preferably in the range of 30 to 90 wt. %.

As the electroconductive support for use in the photoconductors according to the present invention, a metal plate, for example, aluminum, copper and zinc plates, a plastic sheet or film with an electroconductive material, such as aluminum and SnO$_2$, deposited thereon by vacuum evaporation; and paper treated so as to be electroconductive, can be employed.

As the binder materials for use in the present invention, any electrically insulating and adhesive resins, for example, condensation resins such as polyamide, polyurethane, polyester resin, epoxy resin, polyketone, polycarbonate; vinyl polymers such as polyvinylketone, polystyrene, poly-N-vinylcarbazole, polyacrylamide resins; and other electrically insulating and adhesive resins, can be employed.

As the plasticizers for use in the present invention, halogenated paraffin, polybiphenyl chloride, dimethylnaphthalene and dibutyl phthalate can be employed. Further, a silicone resin can be added to the charge transporting layer 15 and to the photoconductive layer 12B in order to make the photoconductive surface thereof smooth.

As the charge transporting materials for use in the present invention, a positive hole transporting material and an electron transporting material can be employed.

Examples of a positive hole transporting material for use in the present invention are the following compounds (1) through (11):

Positive Hole Transporting Compound (1)

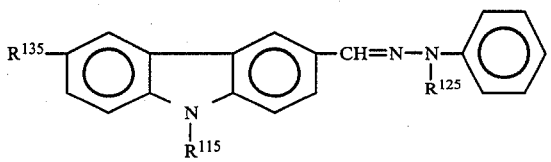

wherein $R^{115}$ represents a methyl group, an ethyl group, a 2-hydroxylethyl group or a 2-chloroethyl group, and $R^{125}$ represents a methyl group, an ethyl group, a benzyl group or a phenyl group, $R^{135}$ represents hydrogen, chlorine, bromine, an alkyl group having 1 to 4 carbon atoms, an alkoxyl group having 1 to 4 carbon atoms, a dialkylamino group, or a nitro group.

Specific examples of the above compound (1) are 9-ethylcarbazole-3-aldehyde 1-methyl-1-phenylhydrazone, 9-ethylcarbazole-3-aldehyde 1-benzyl-1-phenylhydrazone, and 9-ethylcarbazole-3-aldehyde 1,1-diphenylhydrazone.

Positive Hole Transporting Compound (2)

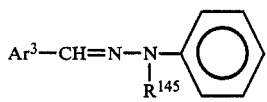

wherein $Ar^3$ represents a naphthalene ring, an anthracene ring, a styryl group, each of which may have a substituent, a pyridyl group, a furyl group, or a thienyl group, and $R^{145}$ represents an alkyl group or a benzyl group.

Specific examples of the above compound (2) are 4-diethylaminostyrene-β-aldehyde 1-methyl-1-phenylhydrazone, and 4-methoxynaphthalene-1-aldehyde 1-benzyl-1-phenylhydrazone.

Positive Hole Transporting Compound (3)

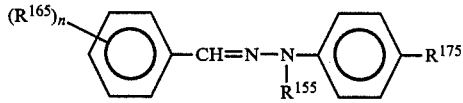

wherein $R^{155}$ represents an alkyl group, a benzyl group, a phenyl group or a naphthyl group, $R^{165}$ represents hydrogen, an alkyl group having 1 to 3 carbon atoms, an alkoxyl group having 1 to 3 carbon atoms, a dialkylamino group, a diaralkylamino group, or a diarylamino group, n represents an integer of 1 to 4, and when n is 2 or more, each $R^{165}$ may be the same or different, and $R^{175}$ represents hydrogen or a methoxy group.

Specific examples of the above compound (3) are 4-methoxybenzaldehyde 1-methyl-1-phenylhydrazone, 2,4-dimethoxybenzaldehyde 1-benzyl-1-phenylhydrazone, 4-diethylaminobenzaldehyde 1,1-diphenylhydrazone, 4-methoxybenzaldehyde 1-benzyl-1-(4-methoxy) phenylhydrazone, 4-diphenylaminiobenzaldehyde 1-benzyl-1-phenylhydrazone, and 4-dibenzylaminobenzaldehyde 1,1-diphenylhydrazone.

Positive Hole Transporting Compound (4)

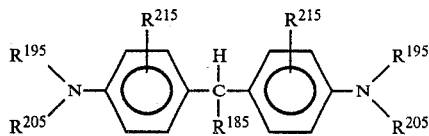

wherein $R^{185}$ represents an alkyl group having 1 to 11 carbon atoms, a phenyl group or heterocyclic group which may have a substituent, $R^{195}$ and $R^{205}$ each represent hydrogen, an alkyl group having 1 to 4 carbon atoms, a hyroxyalkyl group, a chloroalkyl group, an aralkyl group which may have a substituent, $R^{195}$ and $R^{205}$ in combination may form a heterocyclic ring including at least a nitrogen atom, and each $R^{215}$ represents hydrogen, an alkyl group having 1 to 4 carbon atoms, an alkyoxyl group having 1 to 4 carbon atoms, or halogen.

Specific examples of the above compound (4) are 1,1-bis(4-dibenzylaminophenyl) propane, tris(4-diethylaminophenyl) methane, 1,1-bis(4-dibenzylaminophenyl) propane, and 2,2'-diemthyl-4,4'-bis(diethylamino) triphenylmethane.

Positive Hole Transporting Compound (5)

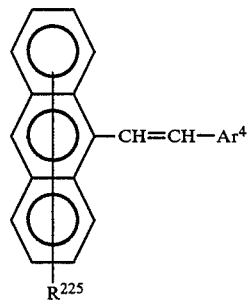

wherein $R^{225}$ represents hydrogen or halogen, and $Ar^4$ represents a phenyl group, a naphthyl group, an anthyryl group or a carbazolyl group, each of which may have a substituent.

Specific examples of the above compound (5) are 9-(4-diethylaminostyryl) anthrancene, and 9-bromo-10-(4-diethylaminostyryl) anthracene.

Positive Hole Transporting Compound (6)

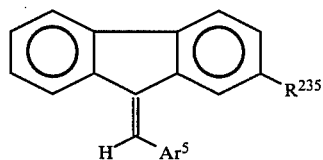

wherein $R^{235}$ represents hydrogen, halogen, a cyano group, an alkoxyl group having 1 to 4 carbon atoms, an alkyl group having 1 to 4 carbon atoms, and $Ar^5$ represents

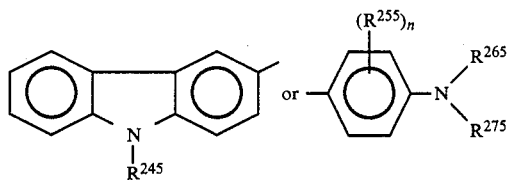

(wherein $R^{245}$ represents an alkyl group having 1 to 4 carbon atoms, $R^{255}$ represents hydrogen, halogen, an alkyl group having 1 to 4 carbon atoms, an alkoxyl group having 1 to 4 carbon atoms, or a dialkylamino group, n represents an integer of 1 or 2, and when n is 2, each $R^{255}$ may be the same or different, and $R^{265}$ and $R^{275}$ each represent hydrogen, an alkyl group having 1 to 4 carbon atoms, which may have a substituent, or a benzyl group which may have a substituent.).

Specific examples of the above compound (6) are 9-(4-dimethylaminobenzylidene) fluorene, and 3-(9-fluorenylidene)-9-ethylcarbole.

Positive Hole Transporting Compound (7)

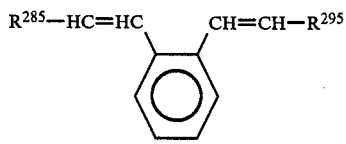

wherein $R^{285}$ and $R^{295}$ each represent a carbazolyl group, a pyridyl group, a thienyl group, an indolyl group, a furyl group; or a phenyl gorup, a styryl group, a naphthyl group, or an anthryl group, each of which may have a substituent selected from the group consisting of a dialkylamono group, an alkyl group, an alkoxyl group, a carboxyl group, an ester group thereof, halogen, a cyano group, an aralkylamino group, an N-alklyl-N-aralkylamino group, an amino group, a nitro group and an acetylamino group.

Specific examples of the above compound (7) are 1,2-bis (4-diethylaminostyryl) benzene, and 1,2-bis(2,4-dimethoxystryl) benzene.

Positive Hole Transporting Compound (8)

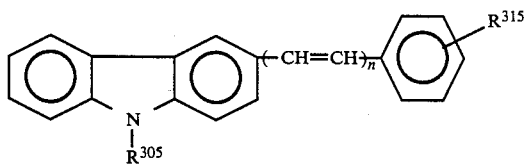

wherein $R^{305}$ represents a lower alkyl group or a benzyl group, $R^{315}$ represents hydrogen, a lower alkyl group, a lower alkoxyl group, halogen, a nitro group, an amino group, or an amino group having a substituent selected from the group consisting of a lower alkyl group and a benzyl group, and n is an integer of 1 or 2.

Specific examples of the above compound (8) are 3-styryl-8-ethylcarbazole, and 3-(4-methoxystyryl)-9-ethylcarbazole.

Positive Hole Transporting Compound (9)

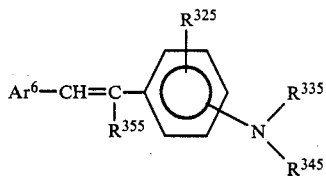

wherein $R^{325}$ represents hydrogen, an alkyl group, an alkoxyl group or halogen, $R^{335}$ and $R^{345}$ each represent an alkyl group, an aralkyl group which may have a substituent, or an aryl group which may have a substituent, $R^{355}$ represents hydrogen, a phenyl group which may have a substituent, and $Ar^6$ represents a phenyl group or a naphthyl group.

Specific examples of the above compound (9) are 4-diphenylaminostilbene, 4-dibenzylaminostilbene, 4-ditolylaminostilbene, 1-(4-diphenylaminostyryl) naphthalene, and 1-(4-diethylaminostyryl) naphthalene.

Positive Hole Transporting Compound (10)

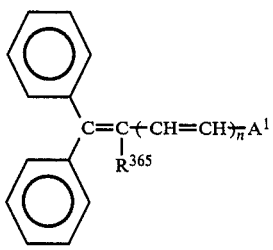

wherein n represents an integer of 0 or 1, $R^{365}$ represents hydrogen, an alkyl group, or a phenyl group which may have a substituent, and $A^1$ represents

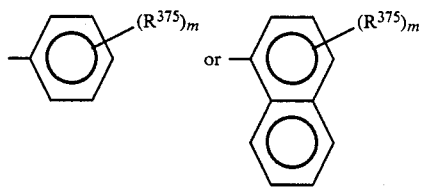

a 9-anthyryl group, or an N-alkylcarbazoyly group which may have a substituent, wherein $R^{375}$ represents hydrogen, an alkyl group, an alkoxyl group, halogen, or

(wherein $R^{385}$ and $R^{395}$ each represent an alkyl group, an aralkyl group which may have a substituent, or an aryl group which may have a substituent, and $R^{385}$ and $R^{395}$ in combination may form a ring), and m represents an integer of 0, 1, 2 or 3, and when m is 2 or more, each $R^{375}$ may be the same or different.

Specific examples of the above compound (10) are 4′-diphenylamino-α-phenylstilbene, and 4′-methylphenylamino-α-phenylstilbene.

Positive Hole Transporting Compound (11)

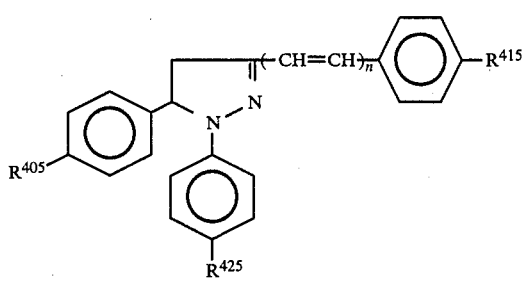

wherein $R^{405}$, $R^{415}$ and $R^{425}$ each represent hydrogen, a lower alkyl group, a lower alkoxyl group, a dialkylamino group or halogen, and n represents an integer of 0 or 1.

Specific examples of the above compound (11) are 1-phenyl-3-(4-diethylaminostyryl)-5-(4-diethylaminophenyl) pyrazoline, and 1-phenyl-3-(4-dimethylaminostyryl)-5-(4-dimethylaminophenyl) pyrazoline.

Other specific examples of a positive hole transporting compound are oxadiazole compounds such as 2,5-bis(4-diethylaminophenyl)-1,3,4-oxadiazole, 2,5-bis[4-(4-diethylamionstyryl) phenyl]-1,3,4-oxadiazole, and 2-(9-ethylcarbozolyl-3-) -5-(4-diethyaminophenyl)-1,3,4-oxadiazole; low molecular weight oxazole compounds such as 2-vinyl-4-(2-chlorophenyl) -5-(4-diethylaminophenyl) oxazole, 2(4-diethylaminophenyl)-4-phenyloxazole; and polymeric compounds such as poly-N-vinylcarbazole, halogenated poly-N-vinylcarbazole, polyvinyl pyrene, polyvinyl anthracene, pyrene-formaldehyde resin, and ethylcarbazole - formaldehyde resin.

Examples of an electron transporting material are choranil, bromanil, tetracyanoethylene, tetracyanoquinone dimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-4H-indeno [1,2-b]thiophene-4-one, and 1,3,7-trinitrodibenzothiophene-5,5-dioxide.

These charge transporting materials can be employed alone or in combination with two or more charge transporting materials.

In the photoconductors according to the present invention, an adhesive layer or a barrier layer can be interposed between the electroconductive support and the photoconductive layer when necessary. The materials suitable for preparing the adhesive layer or barrier layer are polyamide, nitrocellulose and aluminum oxide. It is preferable that the thickness of the adhesive layer or barrier layer be 1 μm or less.

The electrophotographic photoconductor as shown in FIG. 8 can be prepared by depositing in vacuum the bisazo compound on an electroconductive support by a vacuum evaporation method as described, for instance, in U.S. Pat. No. 3,973,959 and U.S. Pat. No. 3,996,049, or by grinding the bisazo compound to small particles with a diameter not greater than 5 μm, preferably not greater than 2 μm, in a ball mill, dispersing the finely-divided bisazo compound in a solution of a binder agent, coating the dispersion on the electroconductive support, using a conventional coating means such as a doctor blade or wire bar, or by dipping the electroconductive support into the dispersion, and drying the same to form a charge generating layer on the electroconductive support, followed by coating a solution of a charge transporting material and a binder agent by such a coating method as mentioned above on the charge generating layer and drying the same to form a charge transporting layer, when necessary with the surface of the charge generating layer finished or the thickness of the charge generating layer adjusted appropriately by buffing as described in Japanese Laid-Open Patent Application No. 51-90827 before coating the solution for forming the charge transporting layer.

The electrophotographic photocondcutor as shown in FIG. 9 can be prepared by coating on an electroconductive support a dispersion of the finely-divided bisazo compound, a charge transporting material and a binder agent, and drying the coated dispersion in the same manner as mentioned above.

Copying by use of the photoconductors according to the present invention can be performed by the process comprising the steps of electrically charging the surface of the photoconductive layer, exposing the charged surface to a light image to form a latent electrostatic image thereof on the photoconductive layer, and developinping the latent electrostatic image with developer. When necessary, the developed image is transferred to paper or other materials and is then fixed thereto.

EXAMPLE 5-1

The following components were ground and dispersed in a ball mill, so that a charge generating layer coating liquid was prepared:

| | Parts by Weight |
|---|---|
| Bisazo Compound No. 1 in Table 1 | 7.5 |
| Tetrahydrofuran solution of polyester resin (Trademark "Vylon 200" made by Toyobo Co., Ltd.) (Solid component 0.5%) | 500 |

The thus prepared charge generating layer coating liquid was coated by a doctor blade on the aluminum-evaporated surface of an aluminum-evaporated polyester base film which served as an electroconductive support, and was then dried at room temperature, so that a charge generating layer having a thickness of about 1 μm was formed on the electroconductive support.

Then the following components were mixed and dissolved, so that a charge transporting layer coating liquid was prepared:

| | Parts by Weight |
|---|---|
| 9-ethylcarbazole-3-aldehyde 1-methyl-1-phenylhydrazone | 2 |
| Polycarbonate resin (Trademark "Panlite K-1300 made by Teijin Limited.) | 2 |
| Tetrahydrofuran | 16 |

The thus prepared charge transporting layer coating liquid was coated on the aforementioned charge generating layer by a doctor blade and was then dried at 80° C. for 2 minutes and then at 105° C. for 5 minutes, so that a charge transporting layer with a thickness of about 20 μm was formed on the charge generating layer; thus, an electrophotographic photoconductor No. 1 according to the present invention of a structure as shown in FIG. 8 was prepared.

EXAMPLES 5-2 THROUGH 5-25

Example 5-1 was repeated except that Bisazo Compound No. 1 employed in Example 5-1 was replaced by the bisazo compounds as listed in Table 3, whereby electrophotographic photoconductors No. 2 through No. 25 according to the present invention were prepared.

EXAMPLES 5-26 THROUGH 5-40

Example 5-1 was repeated except that the charge transporting material (9-ethylcarbazole-3-aldehyde 1-methylphenylhydrazone) and Bisazo Compound No. 1 employed in Example 5-1 were respectively replaced by 1-phenyl-3-(4-diethylaminostyryl)-5-(4-diethylaminophenyl) pyrazoline and the bisazo compounds as listed in Table 4, whereby electrophotographic photoconductors No. 26 through No. 40 according to the present invention were prepared.

EXAMPLES 5-41 THROUGH 5-55

Examples 5-1 was repeated except that the charge transporting material (9-ethylcarbazole-3-aldehyde 1-methylphenylhydrazone) and Bisazo Compound No. 1 employed in Example 5-1 were respectively replaced by α-phenyl-4'-N,N'-diphenylaminostilbene and the bisazo compounds as listed in Table 5, whereby electrophotographic photoconductors No. 41 through No. 55 according to the present invention were prepared.

EXAMPLES 5-56 THROUGH 5-65

Example 5-1 was repeated except that the charge transporting material (9-ethylcarbazole-3-aldehyde 1-methylphenylhydrazone) and Bisazo Compound No. 1 employed in Example 5-1 were respectively replaced by 1,1-bis(4-dibenzylaminophenyl) propane and the bisazo compounds as listed in Table 6, whereby electrophotographic photoconductors No. 56 through No. 65 according to the present invention were prepared.

By use of a Paper Analyzer (Kawaguchi Electro Works, Model SP-428), each of the thus prepared electrophotographic photoconductors No. 1 through No. 65 was negatively charged in the dark under application of −6kV of corona charge for 20 seconds and was then allowed to stand in the dark for 20 seconds without applying any charge thereto. At this moment, the surface potential $V_{po}$(V) was measured. The photoconductor was then illuminated by a tungsten lamp in such a manner that the illuminance on the illuminated surface of the photoconductor was 4.5 lux, and the exposure $E_{\frac{1}{2}}$(lux·seconds) required to reduce the initial surface potential $V_{po}$(V) was measured. The results are shown in Tables 3 through 6.

TABLE 3

| Photoconductor No. | Bisazo Compound No. | $V_{po}$ (V) | $E_{\frac{1}{2}}$ (lux · sec) |
|---|---|---|---|
| 1 | 1 | 594 | 11.8 |
| 2 | 163 | 666 | 5.5 |
| 3 | 58 | 757 | 1.1 |
| 4 | 64 | 860 | 1.6 |
| 5 | 65 | 842 | 2.3 |
| 6 | 66 | 835 | 1.3 |
| 7 | 59 | 797 | 0.9 |
| 8 | 60 | 849 | 1.1 |
| 9 | 61 | 929 | 1.4 |
| 10 | 70 | 248 | 1.3 |
| 11 | 71 | 784 | 0.9 |
| 12 | 72 | 533 | 0.4 |
| 13 | 73 | 934 | 3.9 |
| 14 | 74 | 543 | 0.9 |
| 15 | 75 | 107 | 0.6 |
| 16 | 62 | 907 | 1.3 |
| 17 | 63 | 918 | 1.8 |
| 18 | 76 | 552 | 1.7 |
| 19 | 45 | 108 | 1.3 |
| 20 | 42 | 477 | 4.6 |
| 21 | 44 | 618 | 7.8 |
| 22 | 8 | 621 | 2.2 |
| 23 | 2 | 713 | 4.0 |
| 24 | 4 | 605 | 8.3 |
| 25 | 16 | 639 | 5.4 |

TABLE 4

| Photoconductor No. | Bisazo Compound No. | $V_{po}$ (V) | $E_{\frac{1}{2}}$ (lux · sec) |
|---|---|---|---|
| 26 | 163 | 265 | 1.9 |
| 27 | 58 | 108 | 0.4 |
| 28 | 64 | 481 | 0.7 |
| 29 | 65 | 430 | 0.7 |
| 30 | 76 | 221 | 0.4 |
| 31 | 59 | 124 | 0.3 |
| 32 | 60 | 151 | 0.4 |
| 33 | 61 | 139 | 0.4 |
| 34 | 73 | 473 | 1.2 |
| 35 | 62 | 169 | 0.4 |
| 36 | 63 | 363 | 0.6 |
| 37 | 38 | 383 | 3.5 |
| 38 | 44 | 331 | 1.4 |
| 39 | 4 | 358 | 3.4 |
| 40 | 90 | 420 | 2.0 |

TABLE 5

| Photoconductor No. | Bisazo Compound No. | $V_{po}$ (V) | $E_{\frac{1}{2}}$ (lux · sec) |
|---|---|---|---|
| 41 | 163 | 417 | 4.6 |
| 42 | 58 | 901 | 3.8 |
| 43 | 64 | 1026 | 4.3 |
| 44 | 66 | 953 | 4.6 |
| 45 | 59 | 963 | 2.4 |
| 46 | 60 | 994 | 3.2 |
| 47 | 61 | 1040 | 4.9 |
| 48 | 71 | 965 | 1.9 |
| 49 | 72 | 817 | 1.2 |
| 50 | 74 | 718 | 1.7 |
| 51 | 75 | 514 | 1.0 |
| 52 | 62 | 1075 | 2.5 |
| 53 | 76 | 551 | 3.7 |
| 54 | 45 | 202 | 2.0 |
| 55 | 42 | 491 | 4.5 |

TABLE 6

| Photoconductor No. | Bisazo Compound No. | $V_{po}$ (V) | $E_{\frac{1}{2}}$ (lux · sec) |
|---|---|---|---|
| 56 | 59 | 1098 | 4.1 |
| 57 | 71 | 1159 | 2.8 |
| 58 | 72 | 1020 | 2.2 |
| 59 | 74 | 950 | 2.3 |
| 60 | 45 | 767 | 6.3 |
| 61 | 75 | 808 | 2.3 |
| 62 | 42 | 686 | 5.9 |
| 63 | 16 | 778 | 6.5 |
| 64 | 33 | 527 | 4.3 |
| 65 | 34 | 506 | 4.6 |

COMPARATIVE EXAMPLE 1

A double-layered photoconductor comprising a charge generating layer containing therein a perylene derivative as a charge generating material, and a charge transporting layer containing therein an oxadizole derivative, which is described in U.S. Pat. No. 3,871, 882, was prepared as follows:

N,N'-dimethylperylene-3,4,9,10-tetracarboxydiimide serving as charge generating material was deposited in vacuum on an aluminum plate under the conditions that the degree of vacuum was $10^{-5}$ mmHg, the temperature of the evaporation source was 350° C., and the evaporation time was 3 minutes, whereby a charge generating layer was formed on the aluminum plate serving as electroconductive support.

Then the following components were mixed and dissolved, so that a charge transporting layer coating liquid was prepared:

|  | Parts by Weight |
| --- | --- |
| 2,5-bis(4-diethylaminophenyl)-1,3,4-oxadiazole | 5 |
| Polyester resin (Trademark "Polyester Adhesive 49000" made by Dupont) | 5 |
| Tetrahydrofuran | 90 |

The thus prepared charge transporting layer coating liquid was coated on the aforementioned charge generating layer by a doctor blade and was then dried at 120° C. for 10 minutes, so that a charge transporting layer with a thickness of about 10 μm was formed on the charge generating layer; thus, a comparative electrophotographic photoconductor No. 1 was prepared.

COMPARATIVE EXAMPLE 2

A double-layered photoconductor comprising a charge generating layer containing therein Chloro Diane Blue and a charge transporting layer containing therein a hydrazone compound, which is described in Japanese Patent Publication No. 55-42380 was prepared as follows:

The following components were ground and dispersed in a ball mill, so that a charge generating layer coating liquid was prepared:

|  | Parts by Weight |
| --- | --- |
| Chloro Diane Blue | 25 |
| Ethylenediamine | 1240 |
| n-Butylamine | 990 |
| Tetrahydrofuran | 2740 |

The charge generating layer coating liquid was coated by a doctor blade, with a wet gap of 25 μm, on the aluminum-evaporated surface of an aluminum-evaporated polyester base film which served as an electroconductive support, and was then dried at room temperature, so that a charge generating layer was formed on the electroconductive support.

Then the following components were mixed and dissolved, so that a charge transporting layer coating liquid was prepared:

|  | Parts by Weight |
| --- | --- |
| 4-diethylaminobenzaldehyde 1,1-diphenylhydrazone | 10 |
| Polycarbonate resin (Trademark "Panlite K-1300" made by Teijin Limited.) | 10 |
| Tetrahydrofuran | 80 |

The thus prepared charge transporting layer coating liquid was coated on the aforementioned charge generating layer by a doctor blade and was then dried, so that a charge transporting layer with a thickness of about 18 μm was formed on the charge generating layer; thus, a comparative electrophotographic photoconductor No. 2 was prepared.

COMPARATIVE EXAMPLE 3

A double-layered photoconductor comprising a charge generating layer containing therein a distyrylbenzene bisazo compound, and a charge transporting layer containing therein a hydrazone compound, which is described in Japanese Patent Publication No. 55-84943 was prepared as follows:

The following components were ground and dispersed in a ball mill for 3 hours, so that a charge generating layer coating dispersion was prepared:

|  | Parts by Weight |
| --- | --- |
| 4',4''-bis[2-hydroxy-3-(2,4-dimethylphenylcarbamolyl)-1-naphtylazo]-1,4-distyrylbenzene | 20 |
| Polyvinyl butyral (Trademark "Denka Butyral #4000-1" made by Tokyo Denkikagaku Co., Ltd.) | 3 |
| Polymethyl methacrylate (Trademark "Dianal BR-80" made by Mitsubishi Rayon Engineering Co., Ltd.) | 7 |
| Tetrahydrofuran | 300 |

The above charge generating layer coating dispersion was diluted with 2700 parts by weight of tetrahydrofuran to prepare a charge generating layer coating liquid. The thus prepared charge generating layer coating liquid was coated by a doctor blade on the aluminum-evaporated surface of an aluminum-evaporated polyester base film which served as an electroconductive support, and was then dried at room temperature, so that a charge generating layer with a thickness of about 0.3 μm was formed on the electroconductive support.

Then the following components were mixed and dissolved, so that a charge transporting layer coating liquid was prepared:

|  | Parts by Weight |
| --- | --- |
| 9-ethylcarbazole-3-aldehyde 1-methyl-phenylhydrazone | 10 |
| Polycarbonate resin (Trademark "Panlite K-1300" made by Teijin Limited.) | 10 |
| Tetrahydrofuran | 80 |

The thus prepared charge transporting layer coating liquid was coated on the aforementioned charge generating layer by a doctor blade and was then dried, so that a charge transporting layer with a thickness of about 13 μm was formed on the charge generating layer; thus, a comparative electrophotographic photoconductor No. 3 was prepared.

In order to investigate the photosensitivities to light having a long wavelength of the electrophotographic photoconductor No. 12 according to the present invention and the comparative electrophotographic photoconductors Nos. 1 to 3, the following tests were performed:

Each of the electrophotographic photoconductors was negatively charged in the dark until the surface potential thereof amounted to −800 V or more, and was then allowed to stand in the dark without applying any charge thereto until the surface potential thereof decreased to −800 V. At this moment, the photoconductor was exposed to monochromatic light having a wavelength of 780 nm with an intensity of 1 μW/cm² at the surface of the photoconductor by use of a monochromater, so that the time (seconds) required for the surface potential to decrease to −400 V was measured, from which the half-value exposure (μW·sec/cm²) thereof was obtained.

In the above-mentioned sort of the reduction of the surface potential by the exposure to the monochromatic light, the effect of the dark decay also latently works. Therefore, the true light decay rate (V·cm²·μJ⁻¹) was obtained by deducting the decrease of the surface potential by the latent dark decay effect from the apparent decrease thereof by the exposure to the monochromatic light, that is, by the light decay, to determine the true decrease of the surface potential by the light decay, and then by dividing the true decrease of the surface potential by the first obtained half-value exposure.

The results are shown in the following Table 7.

TABLE 7

| Photoconductors | Light Decay Rate (V · cm² · μJ⁻¹) |
| --- | --- |
| Photocon. No. 12 | 580 |
| Comp. Photocon. No. 1 | 10 or less |
| Comp. Photocon. No. 2 | 10 or less |
| Comp. Photocon. No. 3 | 10 or less |

In Table 1, for instance, in the case of Photoconductor No. 12, the surface potential decrease by 580 V when exposed to the light having an energy of 1 μJ/cm².

The results shown in Tables 3~7 indicate that the electrophotographic photoconductors according to the present invention have high photosensitivity, in particular, as shown in Table 7 in the semi-conductor oscillation wavelength region (780 nm).

Further, the electrophotographic photoconductors according to the present invention have the advantages over the above-mentioned comparative photoconductors Nos. 1 to 3 that they can be produced without difficulty since they can avoid the complicated vacuum deposition process and the use of harmful organic amines.

The electrophotographic photoconductor No. 12 according to the present invention was incorporated in a commerically available copying machine (Trademark "Ricopy FT-4700" made by Ricoh Co., Ltd.) and 10,000 copies were made. The result was that the obtained copies were all clear, which indicates that the photoconductor has excellent durability in the actual use thereof.

What is claimed is:

1. An electrophotographic photoconductor comprising an electroconductive support having thereon a photoconductive layer containing a bisazo compound of the general formula:

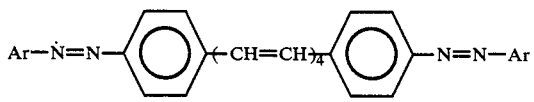

wherein substituent Ar is selected from the group consisting of:

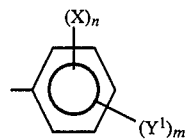
(a)

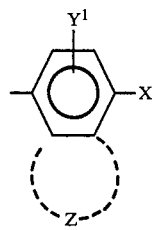
(b)

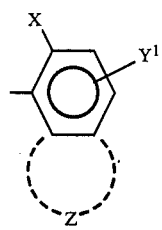
(c)

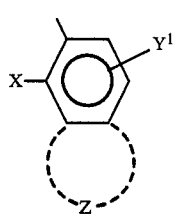
(d)

wherein X, Y¹, Z, m and n respectively represent the following:

X: —OH,

or —NHSO₂—R³ wherein R¹ and R² each represent hydrogen, an alkyl group which may have a substituent, and R³ represents an alkyl group which may have a substituent or an aryl group which may have a substituent;

Y¹: hydrogen, halogen, an alkyl group which may have a substituent, an alkoxyl group which may have a substituent, a carboxyl group, a sulfo group, a sulfamoyl group which may have a substituent, or

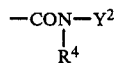

(wherein R⁴ represents hydrogen, an alkyl group which may have a substituent, a phenyl group which may have a substituent; and Y² represents a cyclic hydrocarbon group or a heterocyclic group, each of which may have a substituent, or

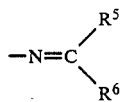

(wherein $R^5$ represents a cyclic hydrocarbon group which may have a substituent, a heterocyclic group which may have a substituent, or a styryl group which may have a substituent, $R^6$ represents hydrogen, an alkyl group which may have a substituent, or a phenyl group which may have a substituent, or $R^5$ and $R^6$ may form a ring through carbon atoms bonded thereto)); and Z: a cyclic hydrocarbon group which may have a substituent, or a heterocyclic group which may have a substituent;

n: an integer of 1 or 2; and m: an integer of 1 or 2;

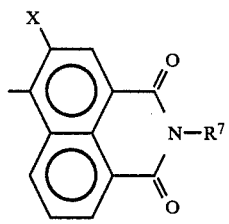 (e)

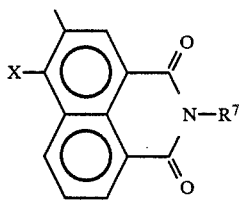 (f)

wherein $R^7$ represents a hydrocarbon group which may have a substituent, and X is the same as defined previously;

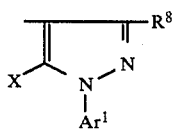 (g)

wherein $R^8$ represents an alkyl group, a carbamoyl group, a carboxyl group or an ester group thereof, $Ar^1$ represents a cyclic hydrocarbon group which may have a substituent, and X is the same as defined previously;

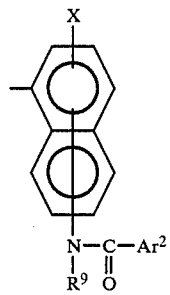 (h)

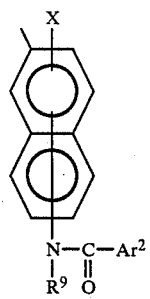 (i)

wherein $R^9$ represents hydrogen or a hydrocarbon group which may have a substituent, $Ar^2$ represents a cyclic hydrocarbon group which may have a substituent, and X is the same as defined previously.

2. An electrophotographic photoconductor as claimed in claim 1, wherein said photoconductive layer further comprises a binder agent in which said bisazo compound is dispersed, and the amount of said bisazo compound is 50 wt. % or less of the total weight of said photoconductive layer.

3. An electrophotographic photoconductor as claimed in claim 1, wherein said photoconductive layer further comprises a charge transporting material.

4. An electrophotographic photoconductor as claimed in claim 1, wherein said photoconductive layer comprises a charge generating layer comprising said bisazo compound, formed on said electroconductive support, and a charge transporting layer formed on said charge generating layer, containing a charge transporting material.

5. An electrophotographic photoconductor as claimed in claim 2, wherein the thickness of said photoconductive layer is in the range of 3 μm to 50 μm.

6. An electrophotographic photoconductor as claimed in claim 3, wherein the amount of said charge transporting material is in the range of 10 wt. % to 95 wt. % of the total weight of said photoconductive layer.

7. An electrophotographic photoconductor as claimed in claim 4, wherein the thickness of said charge generating layer is in the range of 0.01 μm to 5 μm, and the thickness of said charge transporting layer is in the range of 3 μm to 50 μm.

8. An electrophotographic photoconductor as claimed in claim 4, wherein the amount of said bisazo compound is 30 wt. % or more in said charge generating layer and the amount of said charge transporting material in said charge transporting layer is in the range of 10 wt. % to 95 wt. % of the total weight of said charge transporting layer.

* * * * *